United States Patent
Yagami et al.

(10) Patent No.: US 10,607,451 B2
(45) Date of Patent: Mar. 31, 2020

(54) SHARE TABLE ISSUANCE DEVICE, SHARE TABLE ISSUANCE METHOD, AND STORAGE MEDIUM

(71) Applicants: DREAM PLANNING CO., LTD., Osaka (JP); Toshimoto Onaka, Osaka (JP)

(72) Inventors: Hiraku Yagami, Osaka (JP); Akira Yagami, Tokyo (JP)

(73) Assignees: DREAM PLANNING CO., LTD., Osaka (JP); Toshimoto Onaka, Osaka (JP)

( * ) Notice: Subject to any disclaimer, the term of this patent is extended or adjusted under 35 U.S.C. 154(b) by 106 days.

(21) Appl. No.: 16/076,346

(22) PCT Filed: Nov. 21, 2016

(86) PCT No.: PCT/JP2016/084472
§ 371 (c)(1),
(2) Date: Aug. 8, 2018

(87) PCT Pub. No.: WO2017/138214
PCT Pub. Date: Aug. 17, 2017

(65) Prior Publication Data
US 2019/0043303 A1 Feb. 7, 2019

(30) Foreign Application Priority Data
Feb. 9, 2016 (JP) .................................. 2016-022777

(51) Int. Cl.
*G07F 17/32* (2006.01)
*G06Q 50/34* (2012.01)
(Continued)

(52) U.S. Cl.
CPC .............. *G07F 17/329* (2013.01); *A63F 3/06* (2013.01); *A63F 3/065* (2013.01); *A63F 3/08* (2013.01);
(Continued)

(58) Field of Classification Search
None
See application file for complete search history.

(56) References Cited

U.S. PATENT DOCUMENTS

| | | | |
|---|---|---|---|
| 2004/0054593 A1* | 3/2004 | Van Luchen | G06Q 10/087 705/16 |
| 2010/0105462 A1* | 4/2010 | Walker | G07C 15/006 463/17 |

(Continued)

FOREIGN PATENT DOCUMENTS

| | | |
|---|---|---|
| JP | 2001-265900 A | 9/2001 |
| JP | 2002-099806 A | 4/2002 |
| JP | 2015-197720 A | 11/2015 |

OTHER PUBLICATIONS

International Search Report issued in PCT/JP2016/084472; dated Feb. 21, 2017.

*Primary Examiner* — Jason T Yen
(74) *Attorney, Agent, or Firm* — Studebaker & Brackett PC

(57) ABSTRACT

A share table issuance device (1) issues first through N-th share tables (T1 to TN) to first through N-th object persons, respectively. N represents an integer of 2 or greater. The first through N-th share tables (T1 to TN) each include first through N-th ticket fields (D1 to DN), first through N-th share fields (E1 to EN), and an object person field (Cn). The same draw ticket is allocated to n-th ticket fields (Dn) included in the first through N-th share tables (T1 to TN). n represents an integer from 1 to N. A share written in an n-th share field (En) included in an n-th share table (Tn) differs (Continued)

from a share written in an n-th share field (En) included in a k-th share table (Tk). k represents an integer from 1 to N, which differs from the integer represented by n.

18 Claims, 15 Drawing Sheets

(51) Int. Cl.
*G06Q 30/06* (2012.01)
*G07F 17/42* (2006.01)
*A63F 3/08* (2006.01)
*A63F 3/06* (2006.01)

(52) U.S. Cl.
CPC ............ *G06Q 30/06* (2013.01); *G06Q 50/34* (2013.01); *G07F 17/3237* (2013.01); *G07F 17/3244* (2013.01); *G07F 17/42* (2013.01)

(56) References Cited

U.S. PATENT DOCUMENTS

| | | | |
|---|---|---|---|
| 2011/0059786 A1* | 3/2011 | Walker | G07F 17/3276 463/17 |
| 2015/0332540 A1* | 11/2015 | Roy | G07F 17/329 463/17 |
| 2017/0032613 A1* | 2/2017 | Ovalle | G07F 17/329 |

\* cited by examiner

SHARE TABLE ISSUANCE DEVICE, SHARE TABLE ISSUANCE METHOD, AND STORAGE MEDIUM

TECHNICAL FIELD

The present invention relates to a share table issuance device that issues share tables, a share table issuance method, and a storage medium.

BACKGROUND ART

A group organization intermediary system described in Patent Literature 1 assists organization of a group in sharing draw tickets such as lottery tickets among a plurality of appliers. Specifically, the group organization intermediary system distributes prize money according to a transfer rate course rather than equally to each applier. For example, in a transfer rate course, when an applier's draw ticket wins a prize, the applier takes 90% of prize money and transfers 10% of the prize money to the other appliers.

Upon application of each applier, the group organization intermediary system gives the applier a receipt on which a ticket number of the applier's draw ticket and a transfer rate course are written.

CITATION LIST

Patent Literature

[Patent Literature 1]
Japanese Patent Application Laid-Open Publication No. 2001-265900

SUMMARY OF INVENTION

Technical Problem

However, in the group organization intermediary system described in Patent Literature 1, each applier can recognize only the ticket number of his or her draw ticket and the transfer rate course by seeing the receipt.

Accordingly, the applier cannot know amount of transfer from each of the other appliers and ticket numbers of the other appliers' respective draw tickets.

That is, in the group organization intermediary system, in sharing draw tickets among a plurality of appliers, each applier can recognize the ticket number of his or her draw ticket and his or her share for his or her draw ticket, but cannot know the ticket numbers of the other appliers' respective draw tickets and his or her share for the other appliers' respective draw tickets.

The present invention was made in view of the foregoing, and has its object of providing: a share table issuance device capable of issuing share tables from which object persons can accurately recognize their shares; a share table issuance method; and a storage medium.

Solution to Problem

A share table issuance device according to a first aspect of the present invention issues first through N-th share tables to first through N-th object persons, respectively. N represents an integer equal to or greater than 2. The first through N-th share tables each include first through N-th ticket fields, first through N-th share fields, and an object person field. The share table issuance device includes a ticket allocation section, a symbol string writing section, a share writing section, and an object person writing section. The ticket allocation section allocates draw tickets different from one another to the first through N-th ticket fields, respectively. The symbol string writing section writes in the first through N-th ticket fields, symbol strings given to the draw tickets allocated to the first through N-th ticket fields, respectively. The share writing section writes in the first through N-th share fields, shares of money for cases where the money is given to the draw tickets allocated to the first through N-th ticket fields, respectively. The object person writing section writes in the object person fields included in the first through N-th share tables, information items for identifying the first through N-th object persons, respectively. The same draw ticket is allocated to n-th ticket fields included in the first through N-th share tables. n represents an integer of at least 1 and no greater than N. A share written in an n-th share field included in an n-th share table differs from a share written in an n-th share field included in a k-th share table. k represents an integer of at least 1 and no greater than N, which differs from the integer represented by n.

The share table issuance device of the present invention preferably further includes a symbol string reader. The symbol string reader preferably reads the symbol strings. The symbol strings are printed on the draw tickets. The symbol string writing section preferably acquires the symbol strings from the symbol string reader.

The symbol strings given to the draw tickets are each preferably input to a terminal connected to a network. In the share table issuance device of the present invention, the symbol string writing section preferably acquires each of the symbol strings from the terminal through the network.

In the share table issuance device of the present invention, the symbol string writing section, the share writing section, and the object person writing section preferably perform writing into a member list. The member list preferably includes first through N-th member list-use ticket fields, first through N-th member list-use share fields, and first through N-th member list-use object person fields. The symbol string writing section preferably writes in the first through N-th member list-use ticket fields, the symbol strings written in the first through N-th ticket fields, respectively. The share writing section preferably writes in an n-th member list-use share field, the share written in the n-th share field included in the n-th share table. The object person writing section preferably writes in the first through N-th member list-use object person fields, the information items for identifying the first through N-th object persons, respectively.

In the share table issuance device of the present invention, the share writing section preferably writes the shares respectively in n-th share fields included in the first through N-th share tables so that a sum of the shares is less than money possibly to be given to the draw ticket allocated to the n-th ticket fields.

In the share table issuance device of the present invention, the share tables preferably each further include a coupon field. The share table issuance device preferably further includes a coupon writing section that writes a condition for use of a coupon in the coupon field.

A share table issuance method according to a second aspect of the present invention issues first through N-th share tables to first through N-th object persons, respectively. N represents an integer equal to or greater than 2. The first through N-th share tables each include first through N-th ticket fields, first through N-th share fields, and an object person field. The share table issuance method includes: allocating draw tickets different from one another to the first through N-th ticket fields, respectively; writing in the first through N-th ticket fields, symbol strings given to the draw tickets allocated to the first through N-th ticket fields, respectively; writing in the first through N-th share fields, shares of money for cases where the money is given to the draw tickets allocated to the first through N-th ticket fields, respectively; and writing in the object person fields included in the first through N-th share tables, information items for identifying the first through N-th object persons, respectively. The same draw ticket is allocated to n-th ticket fields included in the first through N-th share tables. n represents an integer of at least 1 and no greater than N. A share written in an n-th share field included in an n-th share table differs from a share written in an n-th share field included in a k-th share table. k represents an integer of at least 1 and no greater than N, which differs from the integer represented by n.

A storage medium according to a third aspect of the present invention is a non-transitory computer-readable storage medium storing therein a computer program to be executed by a computer. The computer program causes the computer to perform the share table issuance method according to the above second aspect.

Advantageous Effects of Invention

According to the present invention, a share table issuance device capable of issuing share tables from which object persons can accurately recognize their shares; a share table issuance method; and a storage medium can be provided.

DESCRIPTION OF EMBODIMENTS

Figure 1:
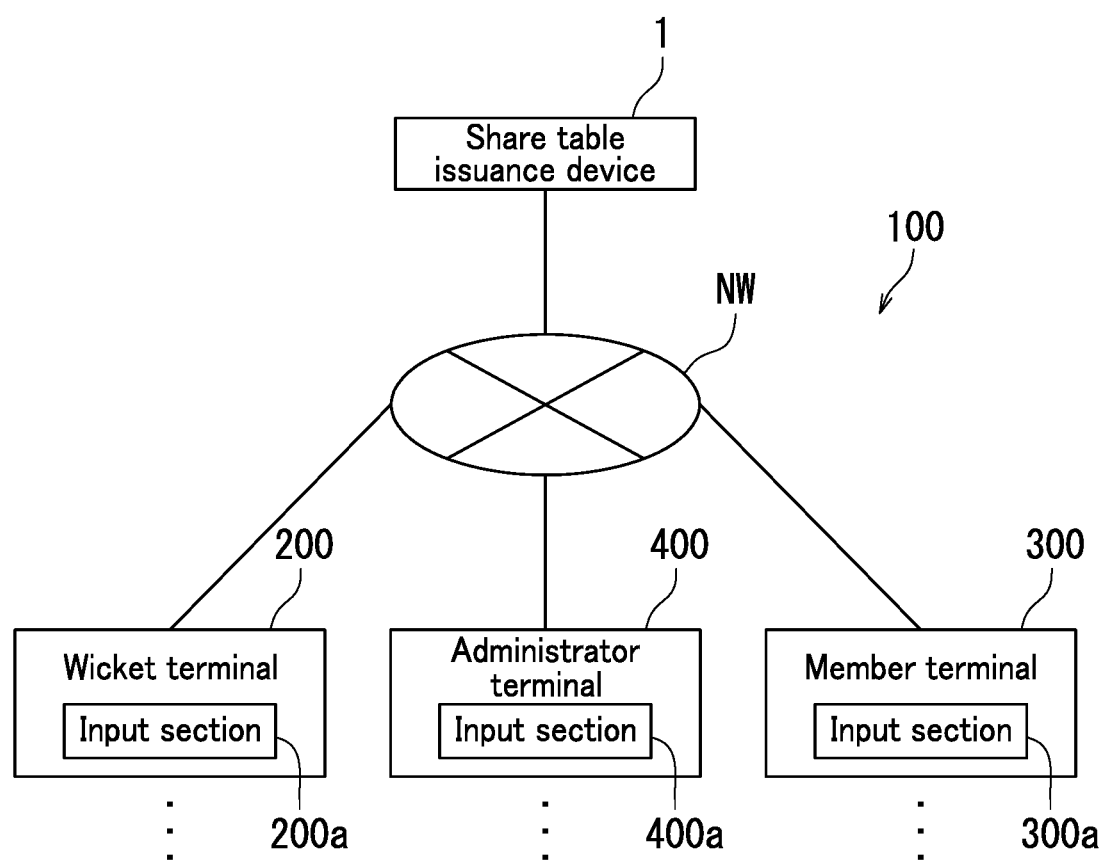
FIG. 1 is a diagram illustrating a share table issuance system according to a first embodiment of the present invention.

The following describes embodiments of the present invention with reference to the drawings. Note that elements that are the same or equivalent are labelled using the same reference signs in the drawings and explanation of which will not be repeated.

First Embodiment

A share table issuance system 100 according to the first embodiment of the present invention will be described with reference to FIGS. 1 to 4. FIG. 1 is a diagram illustrating the share table issuance system 100. As illustrated in FIG. 1, the share table issuance system 100 includes a share table issuance device 1, one or more wicket terminals 200 (one or more terminals), one or more member terminals 300 (one or more terminals), and one or more administrator terminals 400.

The wicket terminal 200 refers to a terminal installed in a shop that serves as a wicket. The wicket refers to a wicket for contact with service provided by an administrator of the share table issuance device 1. The wicket terminal 200 includes an input section 200a. The member terminal 300 refers to a terminal of a member. The member refers to a member of the service provided by the administrator of the share table issuance device 1. The member terminal 300 includes an input section 300a. The administrator terminal 400 refers to a terminal of the administrator. The administrator operates the share table issuance device 1 through the administrator terminal 400. The administrator terminal 400 includes an input section 400a. Each of the input section 200a, the input section 300a, and the input section 400a includes for example at least one of a hardware keyboard, a software keyboard, and a pointing device.

The share table issuance device 1, each wicket terminal 200, each member terminal 300, and each administrator terminal 400 are connected to a network NW and communicate with one another through the network NW. The network NW includes for example the Internet, a local area network (LAN), and a public telephone network.

Upon group purchase of lottery tickets (draw tickets) by first through N-th members (first through N-th object persons), the share table issuance device 1 issues first through N-th share tables to the first through N-th members, respectively. The share table issuance device 1 issues the first through N-th share tables as electronic data. A share of money for a case where the money is given to a lottery ticket is written in each of the first through N-th share tables. In the first embodiment, a share of prize money for a case where a lottery ticket wins a prize is written in each of the first through N-th share tables. That is, the fact that money is given to a lottery ticket indicates that the lottery ticket wins a prize, and money given to the lottery ticket indicates the prize money.

The first through N-th members form a group for the group purchase of the lottery tickets. The first through N-th members refer to members forming a group among members of the service provided by the administrator of the share table issuance device 1.

The share table issuance device 1 also issues a member list for each group. The member list refers to a member list of a group formed for group purchase of lottery tickets.

In the first embodiment, a lottery ticket refers to a regular lottery ticket (regular draw ticket). The regular lottery ticket is issued as a paper medium. A symbol string is printed on the regular lottery ticket before sale.

In the present description, the symbol string refers to a symbol string based on which whether or not to give money to the lottery ticket is determined. The symbol string refers to a string of a plurality of symbols and may include a space between the symbols. A symbol constituting the symbol string may be a character or a numerical character. In the first embodiment, the symbol string indicates a set and a number, such as "06 set No. 154910".

In the present description, "N" represents an integer equal to or greater than 2, which is a finite number.

The following describes a method for distributing money given to a lottery ticket. In the first embodiment, each member can select either of an even distribution method and an anomalous distribution method as the method for distributing money given to a lottery ticket.

The even distribution method is a method by which money given to a lottery ticket is distributed equally to each of the first through N-th members. The first through N-th members' respective shares are equal to one another in the even distribution method.

The anomalous distribution method is a method by which each of the first through N-th members acquires a portion of money when the money is given to a lottery ticket allocated to him or her (hereinafter referred to as a "main lottery ticket") and transfers another portion of the money to others. Therefore, according to the anomalous distribution method, each member among the first through N-th members has a share (hereinafter referred to as a "main share") for the main lottery ticket and a share (hereinafter referred to as a "sub share") for each of lottery tickets allocated to the other members (hereinafter referred to as "sub lottery tickets"), and the main share and the sub share differs from each other.

The "others" may include only the other members or include a third party in addition to the other members. The "other members" refers to members other than himself of herself among the first through N-th members.

In both the even distribution method and the anomalous distribution method, the share table issuance device 1 issues the first through N-th share tables. However, the present description mainly describes operation of the share table issuance device 1 in a situation in which the anomalous distribution method is selected.

Figure 2:
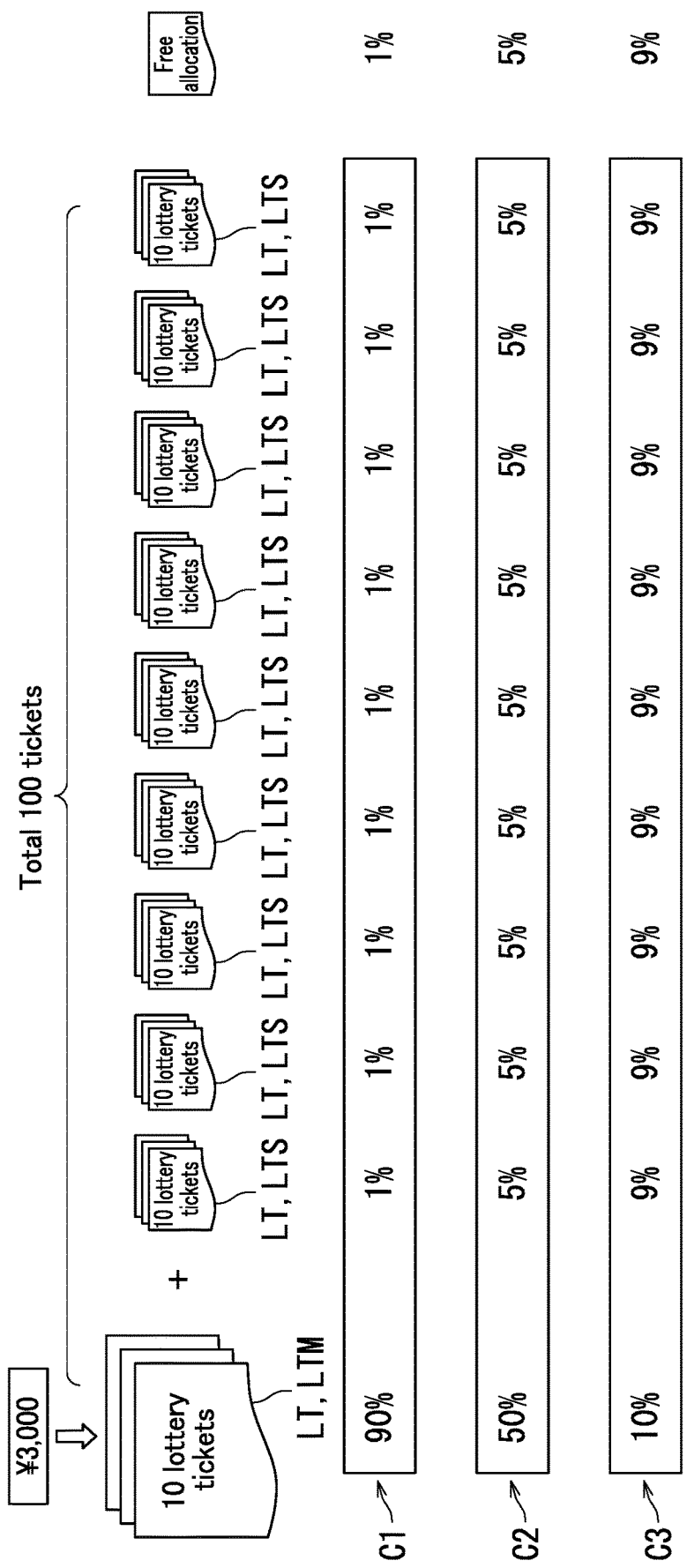
FIG. 2 is a diagram illustrating shares determined by an anomalous distribution method according to the first embodiment.

The following describes the anomalous distribution method according to the first embodiment with reference to FIG. 2. FIG. 2 is a diagram illustrating shares determined by the anomalous distribution method. As illustrated in FIG. 2, the first through tenth members make group purchase of 10 sets of lottery tickets LT. That is, N=10. Each set of lottery tickets LT is constituted by 10 lottery tickets. Each set of lottery tickets LT costs 3,000 yen.

One set of lottery tickets LT is allocated to each of the first through tenth members so that respective different sets of lottery tickets LT are allocated to the first through tenth members. Accordingly, for each of the first through tenth members, the 10 sets of lottery tickets LT include one set of main lottery tickets LTM and nine sets of sub lottery tickets LTS.

Upon application for the group purchase, each member selects a course from among three courses (course C1, course C2, and course C3). Course C1 may be referred to as 9:1 course, course C2 may be referred to as 5:5 course, and course C3 may be referred to as 1:9 course. Each of courses C1 to C3 specifies a main share and a sub share.

In course C1, when money is given to any of the main lottery tickets LTM, the member's share for the main lottery ticket LTM is 90% (main share). When money is given to any of the sub lottery tickets LTS, the member's share for the sub lottery ticket LTS is 1% (sub share). Also, 1% of the money given to the main lottery ticket LTM is transferred to a third party as a free allocation. That is, when the money is given to the main lottery ticket LTM, the third party's share is 1%.

In course C2, the member's share is 50% (main share) for each main lottery ticket LTM and 5% (sub share) for each sub lottery ticket LTS. When money is given to any of the main lottery tickets LTM, the third party's share is 5%. In course C3, the member's share is 10% (main share) for each main lottery ticket LTM and 9% (sub share) for each sub lottery ticket LTS. When money is given to any of the main lottery tickets LTM, the third party's share is 9%.

As described above with reference to FIG. 2, when money is given to any of the main lottery tickets LTM, the member acquires X % of the money and transfers (100−X)% of the money to others according to the anomalous distribution method. Accordingly, the member's share for the main lottery ticket LTM is X % and the member's share for each sub lottery ticket LTS is Y %. Further, the third party's share for a case where the main lottery ticket LTM wins a prize is Z %.

The share Y % and the share Z % are given from a transfer amount (100−X)%. For example, Y=(100−X−Z)/(N−1). For example, X>Y and X>Z. In course C1 for example, X=90, Y=1, Z=1, and N=10.

Note that Y and Z may be equal to or different from each other. Also, it is possible to set no free allocation, in which case Z=0. Also, it is possible to set respective shares for sub lottery tickets LTS unevenly.

Figure 3:
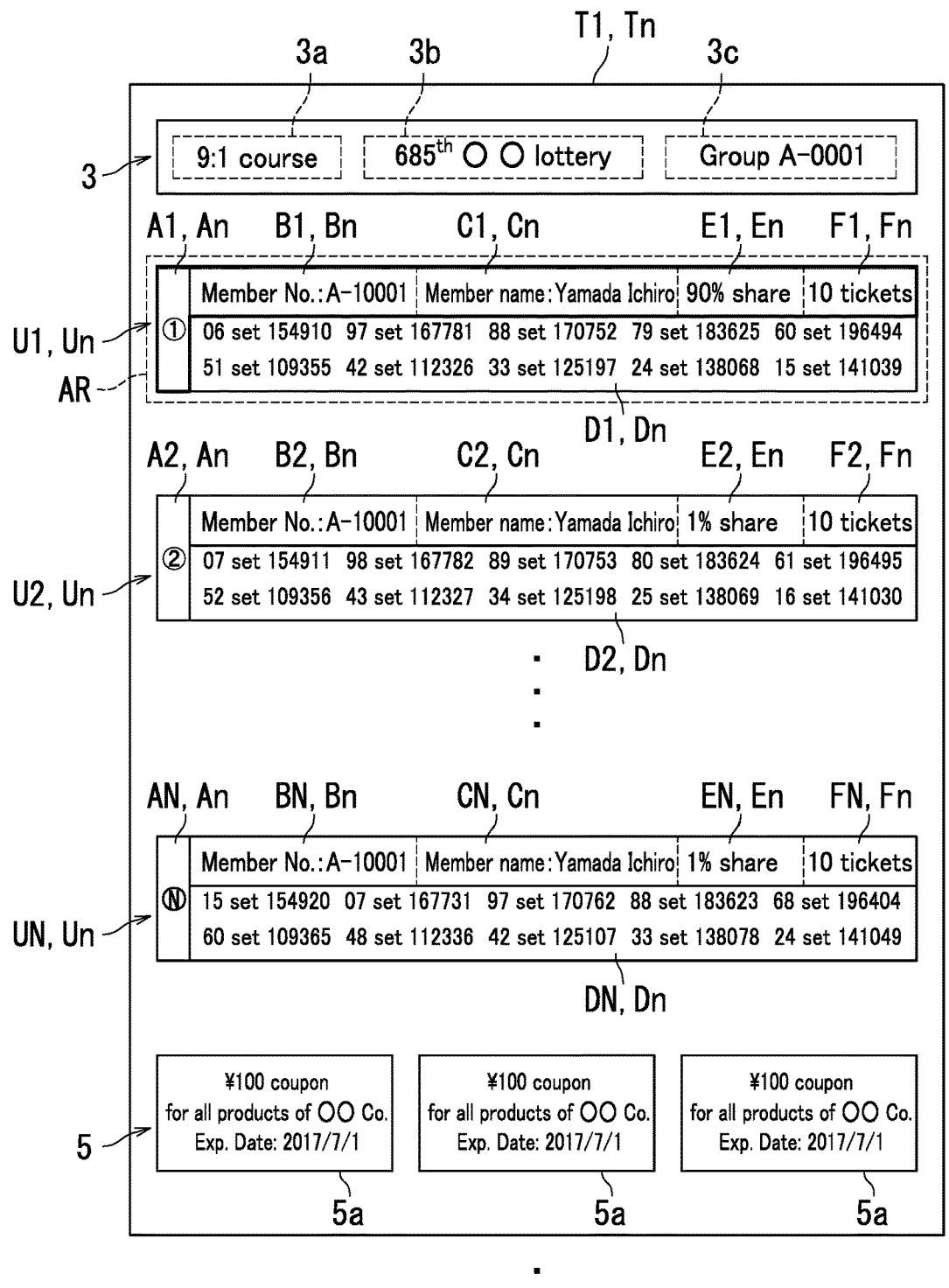
FIG. 3 is a diagram illustrating first through N-th share tables according to the first embodiment.

The following describes the first through N-th share tables T1 to TN according to the first embodiment with reference to FIG. 3. FIG. 3 is a diagram illustrating the first through N-th share tables T1 to TN. For simplification of FIG. 3, the second through (N−1)-th share tables T2 to T(N−1) are omitted and the N-th share table TN is downsized with details thereof omitted.

As illustrated in FIG. 3, the share table issuance device 1 issues the first through N-th share tables T1 to TN to the first through N-th members, respectively.

In the present description, each of the "first through N-th" will be referred to as the "n-th" when there is no need to distinguish the "first through N-th". "n" represents an integer of at least 1 and no greater than N. Also, "n" appended to a reference sign corresponds to "n" of the "n-th".

Each of the first through N-th share tables T1 to TN includes a title unit 3, first through N-th units U1 to UN, and a coupon unit 5.

The title unit 3 includes a course field 3a, a ticket type field 3b, and a group field 3c. A type of course is written in the course field 3a. A type (type and number of times) of lottery tickets is written in the ticket type field 3b. Identification information of a group to which the first through N-th members belong (hereinafter referred to as "group identification information") is written in the group field 3c.

The coupon unit 5 includes one or more coupon fields 5a (three coupon fields 5a in the first embodiment). A condition for use of a coupon is written in each coupon field 5a. Therefore, the first through N-th members can use the coupon field 5a as a coupon.

Each of the first through N-th share tables T1 to TN includes: first through N-th unit identification fields A1 to AN; first through N-th member number fields B1 to BN; first through N-th member name fields C1 to CN (first through N-th object person fields, object person fields); first through N-th ticket fields D1 to DN; first through N-th share fields E1 to EN; and first through N-th ticket quantity fields F1 to FN.

The n-th unit Un includes: the n-th unit identification field An; the n-th member number field Bn; the n-th member name field Cn; the n-th ticket field Dn; the n-th share field En; and the n-th ticket quantity field Fn. For example, the first unit U1 includes: the first unit identification field A1; the first member number field B1; the first member name field C1; the first ticket field D1; the first share field E1; and the first ticket quantity field F1.

The n-th unit Un of the n-th share table Tn is marked. For example, in the first share table T1, the first unit U1 is marked and the second through N-th units U2 to UN are not marked. Note that the fact that the n-th unit Un of the n-th share table Tn is marked indicates that each field included in the n-th unit Un, that is, each of the n-th unit identification field An, the n-th member number field Bn, the n-th member name field Cn, the n-th ticket field Dn, the n-th share field En, and the n-th ticket quantity field Fn is marked.

In the n-th share table Tn, the n-th unit identification field An, the n-th member number field Bn, the n-th member name field Cn, the n-th share field En, and the n-th ticket quantity field Fn, which are marked, are decorated. For example, in the first share table T1, the first unit identification field A1, the first member number field B1, the first member name field C1, the first share field E1, and the first ticket quantity field F1, which are marked, are decorated. FIG. 3 indicates a decorated area by surrounding the area with a bold line. Note that the n-th ticket field Dn, which is marked, may also be decorated.

In the present description, "the n-th unit Un" in the following phrases "the n-th unit Un of the n-th share table Tn" and "the n-th unit Un included in the n-th share table Tn" refers to the n-th unit Un among the first through N-th units U1 to UN included in the n-th share table Tn. Similar matter can be said for the n-th member number field Bn, the n-th member name field Cn, the n-th ticket field Dn, the n-th share field En, and the n-th ticket quantity field Fn, which are included in the n-th unit Un. For example, when N=10, the first unit U1 of the first share table T1 refers to the first unit U1 among the first through tenth units U1 to U10 included in the first share table T1.

In each of the first through N-th share tables T1 to TN, identification information items of the first through N-th units U1 to UN are written in the first through N-th unit identification fields A1 to AN, respectively. In the first embodiment, the identification information item of the n-th unit Un is a number represented by "n". In each of the first through N-th share tables T1 to TN, for example, the identification information item of the first unit U1 is written in the first unit identification field A1. In the first embodiment, the identification information item of the first unit U1 is a number "1".

A member number of the n-th member is written in the first through N-th member number fields B1 to BN included in the n-th share table Tn. For example, the member number of the first member is written in the first through N-th member number fields B1 to BN included in the first share table T1.

The member numbers of the first through N-th members are respectively written in the n-th member number fields Bn included in the first through N-th share tables T1 to TN. For example, the member numbers of the first through N-th members are respectively written in the first member number fields B1 included in the first through N-th share tables T1 to TN.

A member name of the n-th member (object person name of the n-th object person) is written in the first through N-th member name fields C1 to CN included in the n-th share table Tn. For example, the member name of the first member is written in the first through N-th member name fields C1 to CN included in the first share table T1. The n-th member's member name is an example of an information item for identifying the n-th member (the n-th object person).

The member names of the first through N-th members (information items for identifying the first through N-th object persons) are respectively written in the n-th member name fields Cn (n-th object person fields, object person fields) included in the first through N-th share tables T1 to TN. For example, the member names of the first through N-th members are respectively written in the first member name fields C1 included in the first through N-th share tables T1 to TN.

In each of the first through N-th share tables T1 to TN, lottery tickets different from one another are allocated to the first through N-th ticket fields D1 to DN, respectively. The fact that the lottery tickets are different from one another indicates that symbol strings given to the respective lottery tickets are different from one another. In the first embodiment, a symbol string given to a lottery ticket refers to a symbol string printed on the lottery ticket.

A single lottery ticket may be allocated to each of the first through N-th ticket fields D1 to DN. Alternatively, a plurality of lottery tickets may be allocated to each of the first through N-th ticket fields D1 to DN. In the first embodiment, 10 lottery tickets are allocated to each of the first through N-th ticket fields D1 to DN. Further, the same lottery tickets are allocated to the n-th ticket fields Dn included in the first through N-th share tables T1 to TN. For example, the same lottery tickets are allocated to the first ticket fields D1 included in the first through N-th share tables T1 to TN.

In each of the first through N-th share tables T1 to TN, symbol strings given to the lottery tickets allocated to the first through N-th ticket fields D1 to DN are written in the first through N-th ticket fields D1 to DN, respectively. For example, a symbol string given to a lottery ticket allocated to the first ticket field D1 is written in the first ticket field D1.

In each of the first through N-th share tables T1 to TN, shares of money for cases where the money is given to the lottery tickets allocated to the first through N-th ticket fields D1 to DN are written in the first through N-th share fields E1 to EN, respectively. For example, a share of money for a case where the money is given to a lottery ticket allocated to the first ticket field D1 is written in the first share field E1.

However, the share written in the n-th share field En included in the n-th share table Tn differs from the share written in the n-th share field En included in a k-th share table Tk. "k" represents an integer of at least 1 and no greater than N, which differs from an integer represented by "n". For example, the share written in the first share field E1 included in the first share table T1 differs from the shares written in the first share fields E1 included in the second through N-th share tables T2 to TN.

In each of the first through N-th share tables T1 to TN, the numbers of the lottery tickets allocated to the first through N-th ticket fields D1 to DN are written in the first through N-th ticket quantity fields F1 to FN, respectively. For example, the number of the lottery tickets allocated to the first ticket field D1 is written in the first ticket quantity field F1.

As described above with reference to FIG. 3, according to the first embodiment, the same lottery tickets are allocated to the n-th ticket fields Dn included in the first through N-th share tables T1 to TN. In addition, the share written in the n-th share field En included in the n-th share table Tn differs from the share written in the n-th share field En included in the k-th share table Tk. Therefore, the first through N-th share tables T1 to TN are suitable for writing shares determined by the anomalous distribution method.

That is, main lottery tickets for the n-th member are allocated to the n-th ticket field Dn included in the n-th share table Tn and symbol strings given to the main lottery tickets are written in the same n-th ticket field Dn. Also, in the n-th share table Tn, sub lottery tickets for the n-th member are allocated to ticket fields other than the n-th ticket field Dn among the first through N-th ticket fields D1 to DN and symbol strings given to the sub lottery tickets are written in the ticket fields other than the n-th ticket field Dn. In addition, a main share for the n-th member is written in the n-th share field En included in the n-th share table Tn. Further, in the n-th share table Tn, a sub share for the n-th member is written in each of share fields other than the n-th share field En among the first through N-th share fields E1 to EN.

For example, in the first share table T1 issued to the first member, main lottery tickets are allocated to the first ticket field D1 and sub lottery tickets are allocated to the second through N-th ticket fields D2 to DN. For example, in the first share table T1 issued to the first member, a main share is written in the first share field E1 and a sub share is written in each of the second through N-th share fields E2 to EN.

Also, as described with reference to FIGS. 1 to 3, according to the first embodiment, the share table issuance device 1 issues the first through N-th share tables T1 to TN to the first through N-th members, respectively. The n-th member can accurately recognize the main share by seeing the n-th share field En included in the n-th share table Tn. Also, the n-th member can accurately recognize the sub share by seeing share fields other than the n-th share field En included in the n-th share table Tn. That is, even when the n-th member has the main share and the sub share, the n-th member can accurately recognize his or her shares.

Further, according to the first embodiment, the n-th member can accurately recognize the main lottery tickets by seeing the n-th ticket field Dn included in the n-th share table Tn. Also, the n-th member can accurately recognize the sub lottery tickets by seeing ticket fields other than the n-th ticket field Dn included in the n-th share table Tn.

Further, according to the first embodiment, symbol strings printed on lottery tickets can be read beforehand by a symbol string reader 40. Therefore, the symbol strings can be written beforehand in the first ticket field D1 to the N-th ticket field included in the n-th share table Tn. As a result, the n-th share table Tn can be immediately issued upon application for the group purchase by a member. Since the n-th share table Tn can be immediately issued, troublesomeness and worry that the member might feel for the group purchase of the lottery tickets can be relieved.

Further, according to the first embodiment, the first through N-th share tables T1 to TN each include the coupon field 5a. This results in improvement in economic value and advertisement value of the first through N-th share tables T1 to TN.

Further, according to the first embodiment, a portion of money given to a lottery ticket can be transferred to a third party as a free allocation. Specifically, a sum of the shares written in the n-th share fields En included in the first through N-th share tables T1 to TN is less than money possibly to be given to a lottery ticket allocated to the n-th ticket field Dn. Therefore, when the money is given to the lottery ticket allocated to the n-th ticket field Dn and distributed to the first through n-th members, surplus money is generated. As a result, the surplus money can be given to the third party. For example, it is possible to support a social contribution activity by giving the surplus money to a third party conducting the social contribution activity. For example, a sum of the shares written in the first share fields E1 included in the first through N-th share tables T1 to TN is 99% rather than 100% and less than money possibly to be given to a lottery ticket allocated to the first ticket field D1.

Figure 4:
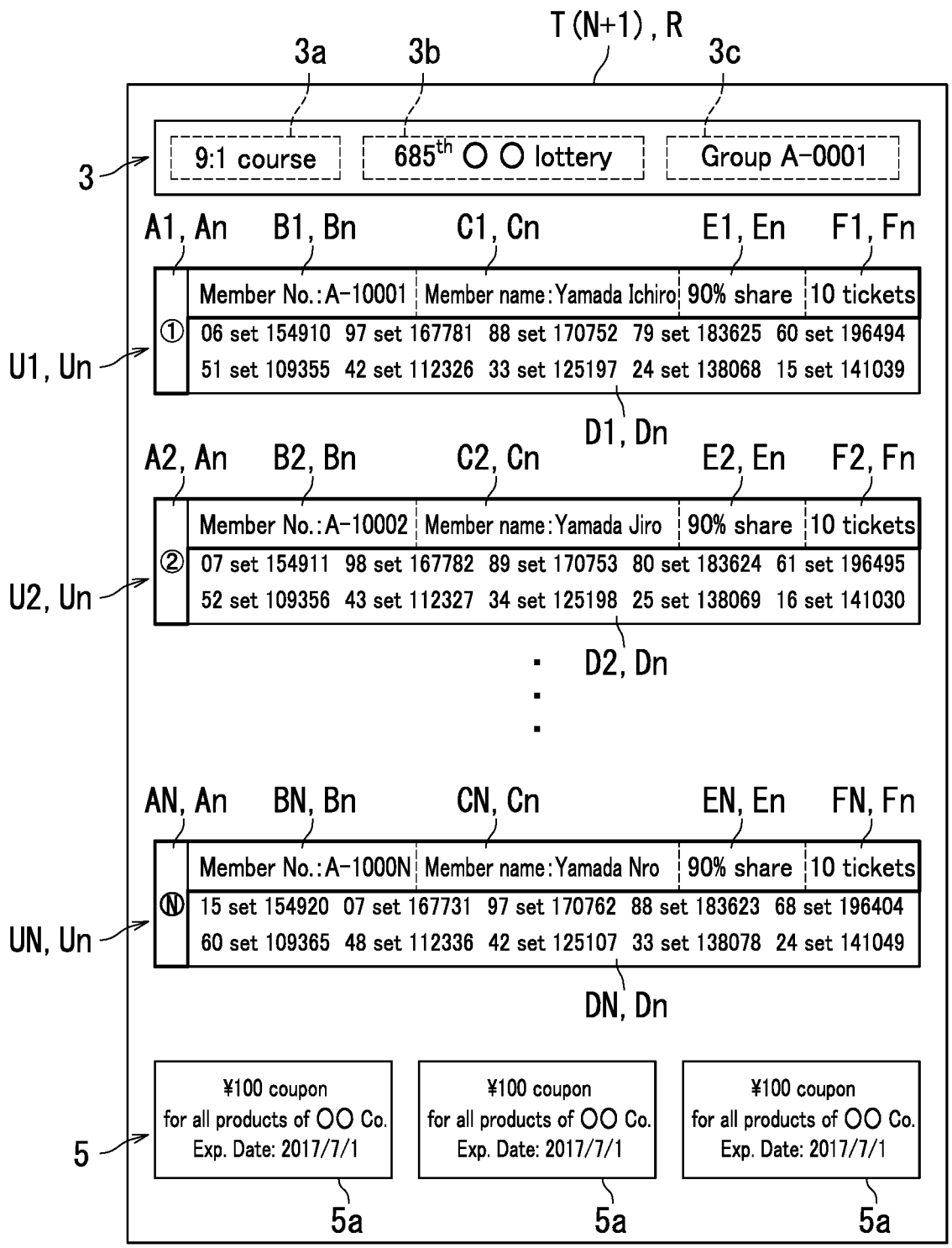
FIG. 4 is a diagram illustrating a member list according to the first embodiment.

The following describes a member list R according to the first embodiment with reference to FIG. 4. FIG. 4 is a diagram illustrating the member list R. As illustrated in FIG. 4, the share table issuance device 1 issues an (N+1)-th share table T(N+1) as the member list R. The share table issuance device 1 issues the member list R as electronic data. The configuration of the member list R is similar to that of each of the first through N-th share tables T1 to TN.

For example, the member list R includes first through N-th ticket fields D1 to DN (first through N-th member list-use ticket fields). The symbol strings written in the first through N-th ticket fields D1 to DN included in the n-th share table Tn are written in the first through N-th ticket fields D1 to DN included in the member list R, respectively.

For example, the member list R includes first through N-th member number fields B1 to BN. However, a member number written in the n-th member number field Bn included in the n-th share table Tn is written in the n-th member number field Bn included in the member list R. Specifically, the member numbers of the first through N-th members are written in the first through N-th member number fields B1 to BN included in the member list R, respectively.

For example, the member list R includes first through N-th member name fields C1 to CN (first through N-th member list-use object person fields). However, a member name written in the n-th member name field Cn included in the n-th share table Tn is written in the n-th member name field Cn (n-th member list-use object person field) included in the member list R. Specifically, the member names of the first through N-th members are written in the first through N-th member name fields C1 to CN included in the member list R, respectively.

For example, the member list R includes first through N-th share fields E1 to EN (first through N-th member list-use share fields). However, a share written in the n-th share field En included in the n-th share table is written in the n-th share field En included in the member list R. For example, a share written in the first share field E1 included in the first share table is written in the first share field E1 included in the member list R.

As described above with reference to FIG. 4, according to the first embodiment, the member list R for group purchase of lottery tickets can be easily issued based on the symbol strings written in the first through N-th ticket fields D1 to DN included in the n-th share table Tn, the share written in the n-th share field En included in the n-th share table Tn, and the member names of the first through N-th members (information items for identifying the first through N-th members). That is, the member list R can be easily issued based on contents of the first through N-th share tables T1 to TN.

Figure 5:
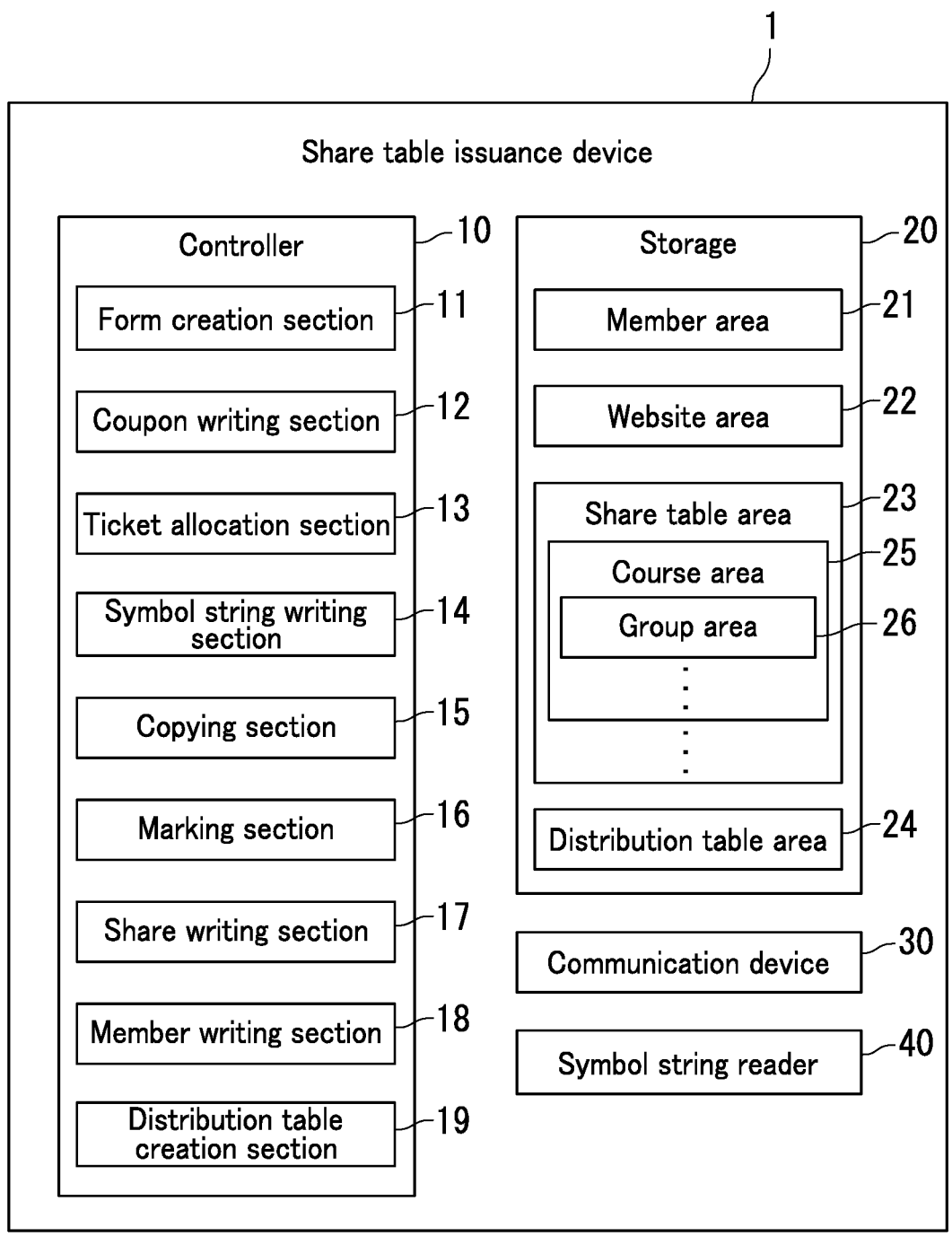
FIG. 5 is a diagram illustrating a share table issuance device according to the first embodiment.

The following describes a configuration of the share table issuance device 1 with reference to FIG. 5. FIG. 5 is a diagram illustrating the share table issuance device 1. The share table issuance device 1 includes a controller 10, storage 20, a communication device 30, and the symbol string reader 40. The controller 10, the storage 20, and the communication device 30 are mounted on a server, for example.

The controller 10 includes a form creation section 11, a coupon writing section 12, a ticket allocation section 13, a symbol string writing section 14, a copying section 15, a marking section 16, a share writing section 17, a member writing section 18 (object person writing section), and a distribution table creation section 19. The coupon writing section 12, the symbol string writing section 14, the share writing section 17, and the member writing section 18 perform writing into the first through N-th share tables T1 to TN and the member list R. Specifically, the coupon writing section 12 writes a condition for use of a coupon in the coupon field 5a and the symbol string writing section 14 writes symbol strings in the first through N-th ticket fields D1 to DN. The share writing section 17 writes shares in the first through N-th share fields E1 to EN and the member writing section 18 writes member names in the first through N-th member name fields C1 to CN.

The controller 10 includes for example a processor such as a central processing unit (CPU). The storage 20 stores therein data and computer programs. The storage 20 includes for example memory such as semiconductor memory and may include a hard disk drive and/or a removable media. The storage 20 is an example of a non-transitory computer-readable storage medium. Through execution of the computer programs stored in the storage 20, the processor of the controller 10 functions as the form creation section 11, the coupon writing section 12, the ticket allocation section 13, the symbol string writing section 14, the copying section 15, the marking section 16, the share writing section 17, the member writing section 18, and the distribution table creation section 19.

The storage 20 includes a member area 21, a website area 22, a share table area 23, and a distribution table area 24. The share table area 23 includes one or more course areas 25. In the first embodiment, the share table area 23 includes three course areas 25 corresponding to courses C1 to C3. Each course area 25 includes one or more group areas 26.

The storage 20 stores personal information of each member in the member area 21. Specifically, the storage 20 stores in the member area 21 personal information of each member in association with identification information of the member. The personal information includes, for example, name, address, age, sex, telephone number, mail address, financial institution account number, and name of an organization that the member wants to support. The storage 20 stores data of a website in the website area 22. The website provides information about the service provided by the administrator of the share table issuance device 1. Also, the storage 20 stores data of each of a plurality of member pages in the website area 22. A member page refers to a website prepared for each member. The member can access the member page by logging in thereto. The distribution table area 24 will be described later.

The communication device 30 communicates with each wicket terminal 200, each member terminal 300, and each administrator terminal 400 through the network NW. The communication device 30 includes for example a network interface controller.

The symbol string reader 40 has an optical character recognition (OCR) function and optically reads a symbol string printed on a lottery ticket.

The following describes a share table issuance method performed by the share table issuance device 1 with reference to FIGS. 5 to 12. For simplification of explanation, the following describes a situation in which 10 members (first through tenth members) form a group to make group purchase of lottery tickets. That is, N=10. Also, 10 sets of lottery tickets (first through tenth sets of lottery tickets) will be described as the purchased lottery tickets. Each set of the lottery tickets is constituted by 10 lottery tickets. Further, share tables (first through tenth share tables T1 to T10) for course C1 (FIG. 2) are issued in the following situation.

Figure 6:
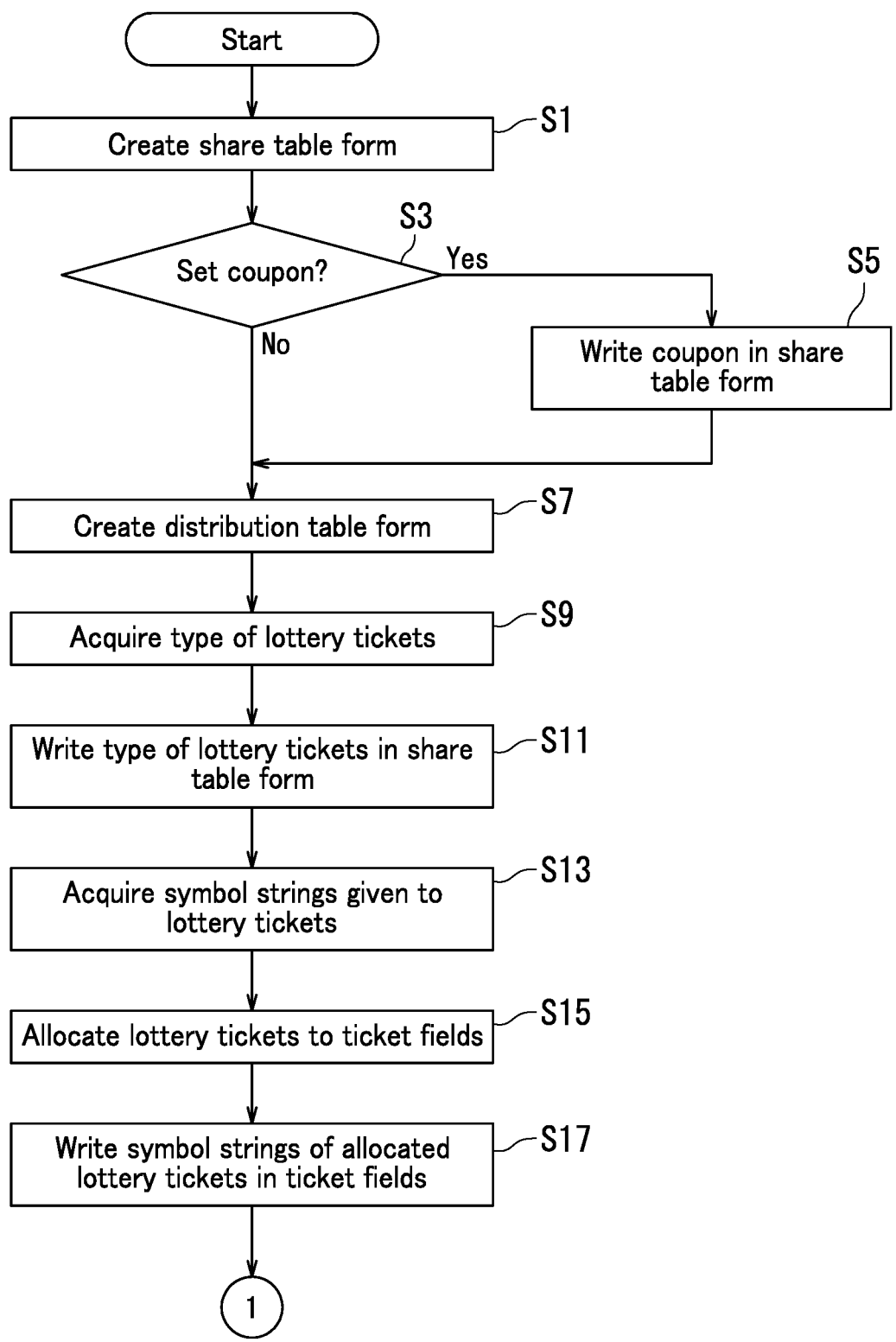
FIG. 6 is a flowchart illustrating a part of a share table issuance method according to the first embodiment.
Figure 7:
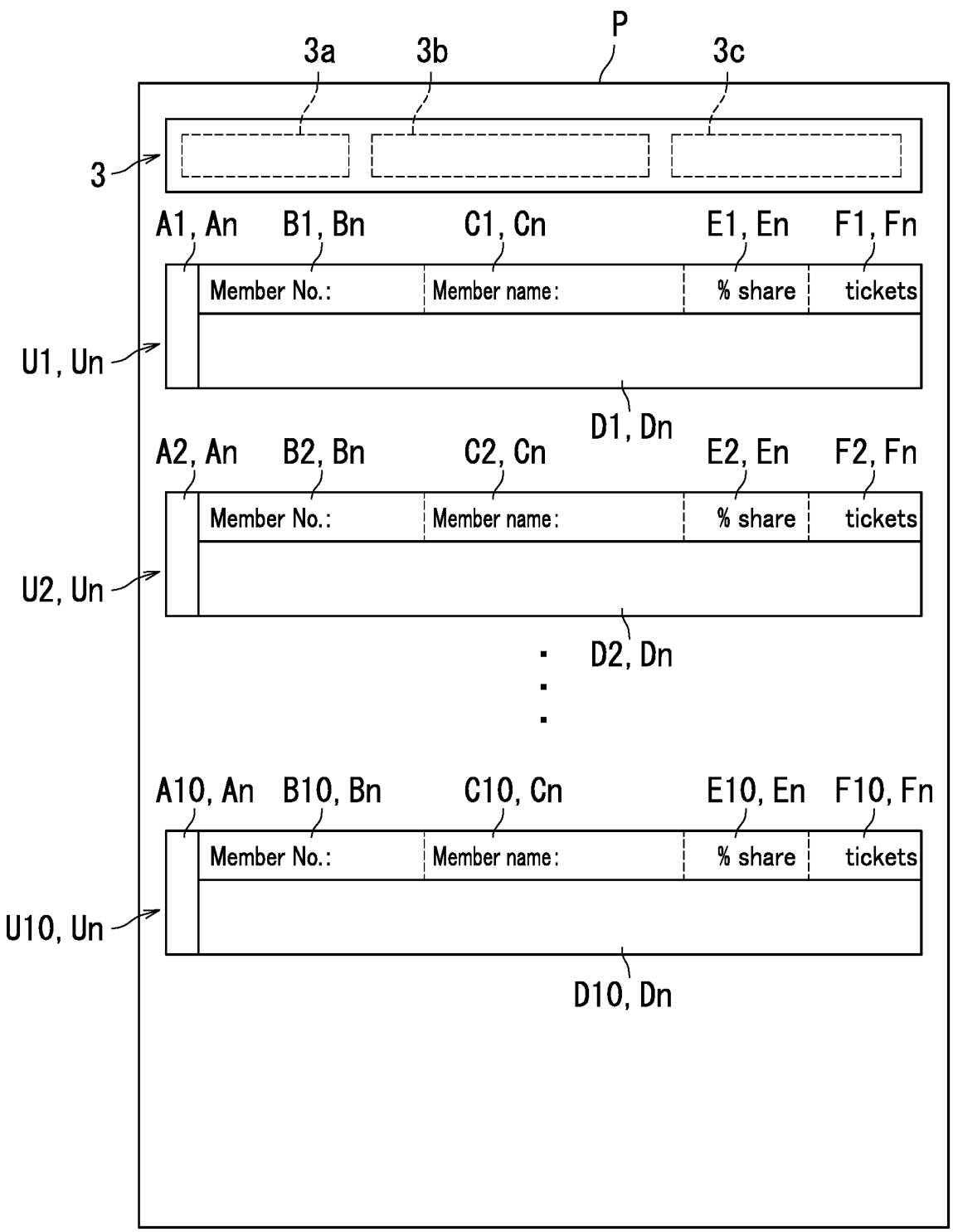
FIG. 7 is a diagram illustrating a share table form according to the first embodiment.
Figure 8:
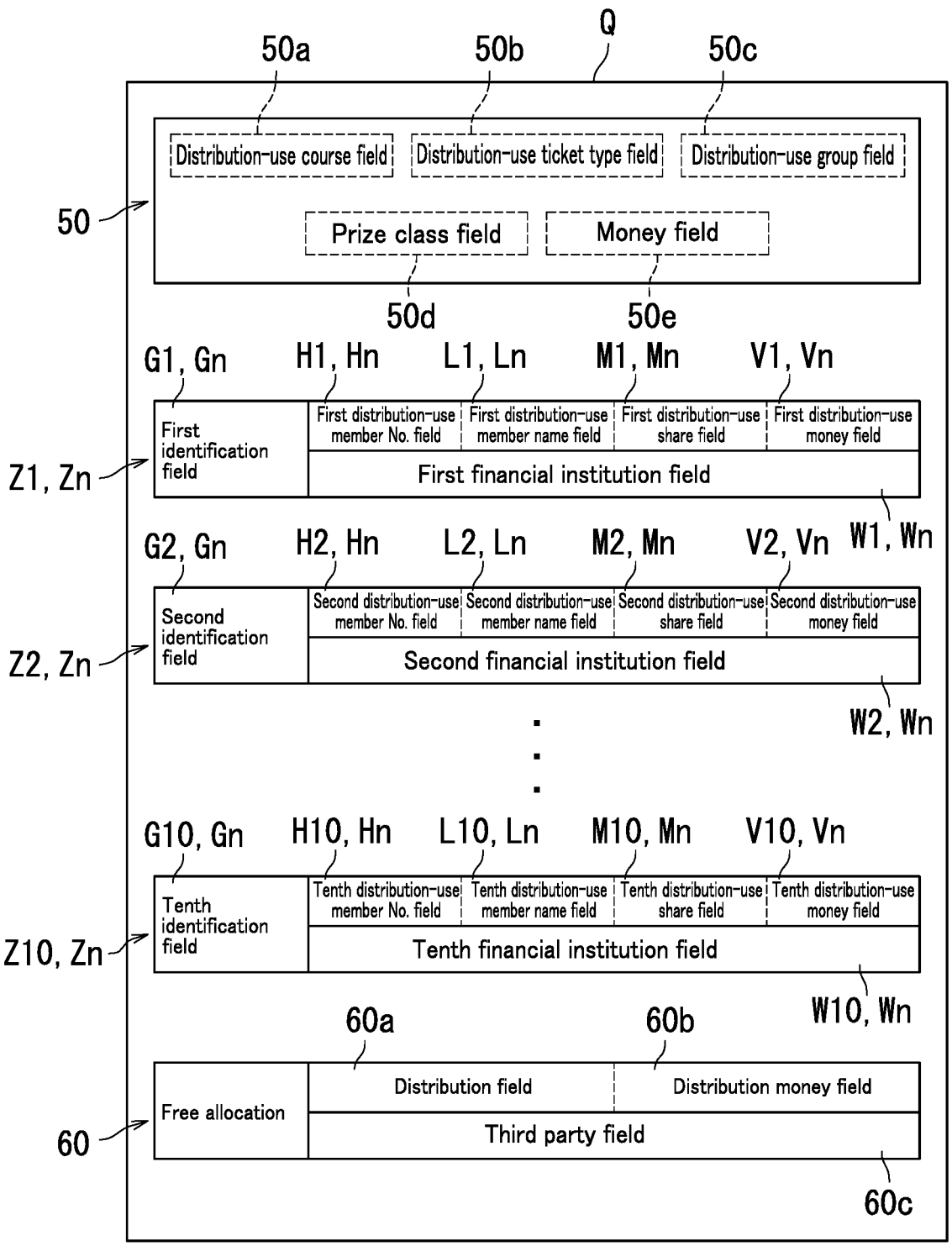
FIG. 8 is a diagram illustrating a distribution table form according to the first embodiment.

FIG. 6 is a flowchart illustrating a part of the share table issuance method according to the first embodiment. FIG. 7 is a diagram illustrating a share table form P according to the first embodiment. FIG. 8 is a diagram illustrating a distribution table form Q according to the first embodiment.

As illustrated in FIG. 6, the share table issuance method includes Steps S1 to S17 and is performed by the controller 10 of the share table issuance device 1.

As illustrated in FIGS. 5 to 7, the form creation section 11 of the controller 10 creates the share table form P at Step S1. The form creation section 11 then causes the share table form P to be stored in the course area 25 corresponding to course C1.

The configuration of the share table form P is similar to that of the n-th share table Tn in all aspects other than that the coupon unit 5 is not included. That is, the share table form P includes the title unit 3 and the first through tenth units U1 to U10. However, each of the course field 3a, the ticket type field 3b, the group field 3c, the n-th unit identification field An, the n-th member number field Bn, the n-th member name field Cn, the n-th ticket field Dn, the n-th share field En, and the n-th ticket quantity field Fn is blank.

As illustrated in FIG. 6, the coupon writing section 12 determines at Step S3 whether or not an instruction for setting a coupon for the n-th share table Tn is given. When negative determination is made (No at Step S3), the routine proceeds to Step S7. By contrast, when positive determination is made (Yes at Step S3), the routine proceeds to Step S5.

At Step S5, the coupon writing section 12 makes a coupon field 5a similar to that illustrated in FIG. 3 next to the tenth unit U10 in the share table form P. The coupon writing section 12 then writes a condition for use of a coupon in the coupon field 5a. The routine then proceeds to Step S7.

As illustrated in FIGS. 6 and 8, the form creation section 11 creates the distribution table form Q at Step S7. The form creation section 11 then causes the distribution table form Q to be stored in the distribution table area 24.

The distribution table form Q includes a distribution title unit 50, first through tenth distribution units Z1 to Z10, and a free allocation unit 60.

The distribution title unit 50 includes a blank distribution-use course field 50a, a blank distribution-use ticket type field 50b, a blank distribution-use group field 50c, a blank prize class field 50d, and a blank money field 50e.

A type of course is to be written in the distribution-use course field 50a. A type of the main lottery ticket is to be written in the distribution-use ticket type field 50b. Group identification information is to be written in the distribution-use group field 50c. Also, a prize class (won prize) is to be written in the prize class field 50d when money is given to the main lottery ticket. An amount of the money (prize money) given to the main lottery ticket is to be written in the money field 50e.

The distribution table form Q includes: blank first through tenth identification fields G1 to G10; blank first through tenth distribution-use member number fields H1 to H10; blank first through tenth distribution-use member name fields L1 to L10; blank first through tenth distribution-use share fields M1 to M10; blank first through tenth distribution-use money fields V1 to V10; and blank first through tenth financial institution fields W1 to W10.

The n-th distribution unit Zn includes: the n-th identification field Gn; the n-th distribution-use member number field Hn; the n-th distribution-use member name field Ln; the n-th distribution-use share field Mn; the n-th distribution-use money field Vn; and the n-th financial institution field Wn.

The first through tenth distribution units Z1 to Z10 correspond to the first through tenth members, respectively.

Identification information items of the first through tenth distribution units Z1 to Z10 are to be written in the first through tenth identification fields G1 to G10, respectively. In the first embodiment, the identification information item of the n-th distribution unit Zn is a number represented by "n".

Member numbers of the first through tenth members are to be written in the first through tenth distribution-use member number fields H1 to H10, respectively. Member names of the first through tenth members are to be written in the first through tenth distribution-use member name fields L1 to L10, respectively.

The main share is to be written in one of the first through tenth distribution-use share fields M1 to M10 and the sub share is to be written in each of the other nine distribution-use share fields. Distribution money based on the main share is to be written in one of the first through tenth distribution-use money fields V1 to V10 and distribution money based on the sub share is to be written in each of the other nine distribution-use money fields.

Information items of financial institutions (names of the financial institutions and account numbers) specified by the first through tenth members are to be written in the first through tenth financial institution fields W1 to W10, respectively.

The free allocation unit 60 includes a blank distribution field 60a, a blank distribution money field 60b, and a blank third party field 60c. When money is distributed to a third party as a free allocation, the third party's share is to be written in the distribution field 60a. Distribution money based on the third party's share is to be written in the distribution money field 60b. Information of a financial institution (name of the financial institution and account number) is to be written in the third party field 60c. The distribution money based on the third party's share is to be paid to the financial institution.

As illustrated in FIG. 6, the ticket allocation section 13 acquires information indicating a type of lottery tickets at Step S9. Specifically, the information indicating the type of the lottery tickets is input to the administrator terminal 400 through the input section 400a thereof. The administrator terminal 400 transmits the information indicating the type of the lottery tickets to the share table issuance device 1. The ticket allocation section 13 acquires the information indicating the type of the lottery tickets through the network NW and the communication device 30.

At Step S11, the ticket allocation section 13 writes the type of the lottery tickets in the ticket type field 3b of the share table form P. Also, the ticket allocation section 13 generates group identification information. The ticket allocation section 13 writes the group identification information in the group field 3c of the share table form P. Also, the ticket allocation section 13 writes course C1 in the course field 3a of the share table form P. Further, the ticket allocation section 13 writes the number of lottery tickets included in one set, that is, "10" in each of the first through tenth ticket quantity fields F1 to F10.

Further, the ticket allocation section 13 moves the share table form P to a group area 26 corresponding to the group identification information and causes the share table form P to be stored in the group area 26.

Note that when no one applies for group purchase within a specific period, the share table form P is deleted from the group area 26. During the specific period, the share table form P is stored in the group area 26 until at least one person applies for group purchase.

At Step S13, the symbol string writing section 14 acquires symbol strings given to lottery tickets. Specifically, the symbol string reader 40 successively reads 100 lottery tickets and acquires a symbol string from each lottery ticket. The symbol string reader 40 then outputs the symbol string for each lottery ticket to the symbol string writing section 14. The symbol string writing section 14 acquires each symbol string from the symbol string reader 40.

For example, the administrator prepares the lottery tickets beforehand. The symbol string reader 40 reads the symbol strings given to the lottery tickets in advance before the share table issuance device 1 receives application for group purchase of the lottery tickets from a member through the wicket terminal 200 or the member terminal 300. Accordingly, the symbol string writing section 14 acquires the symbol strings given to the lottery tickets in advance before the share table issuance device 1 receives application for the group purchase of the lottery tickets.

At Step S15, the ticket allocation section 13 allocates lottery tickets different from one another to the first through tenth ticket fields D1 to D10 of the share table form P, respectively. Specifically, the ticket allocation section 13 allocates first through tenth sets of the lottery tickets to the first through tenth ticket fields D1 to D10, respectively.

At Step S17, the symbol string writing section 14 writes the symbol strings given to the lottery tickets allocated to the first through tenth ticket fields D1 to D10 of the share table form P in the first through tenth ticket fields D1 to D10, respectively. Specifically, the symbol string writing section 14 writes the symbol strings given to the lottery tickets of the first through tenth sets in the first through tenth ticket fields D1 to D10, respectively.

For example, before the share table issuance device 1 receives application for the group purchase of the lottery tickets, the symbol string writing section 14 writes the symbol strings given to the lottery tickets in the first through tenth ticket fields D1 to D10 in advance. As a result, the share table issuance device 1 can immediately issue the first through tenth share tables T1 to T10 upon application for the group purchase by the respective members.

Figure 9:
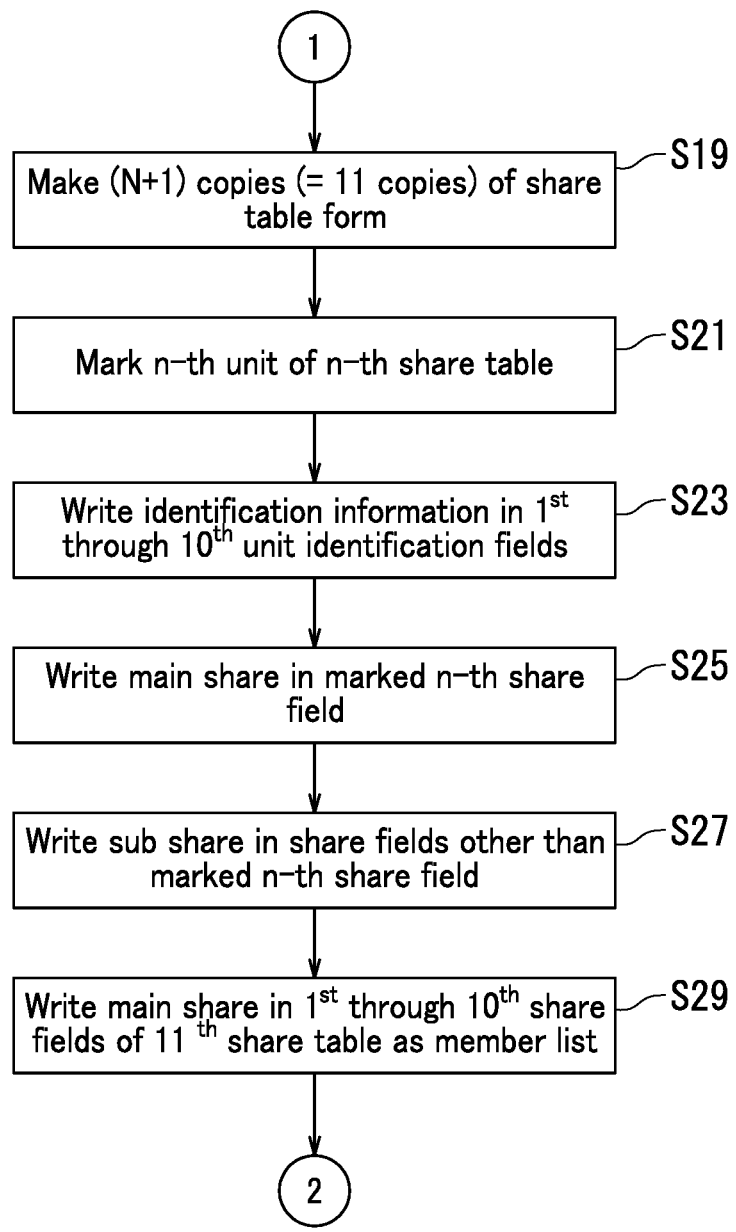
FIG. 9 is a flowchart illustrating another part of the share table issuance method according to the first embodiment.

After Step S17, the routine proceeds to Step S19 in FIG. 9.

Figure 10:
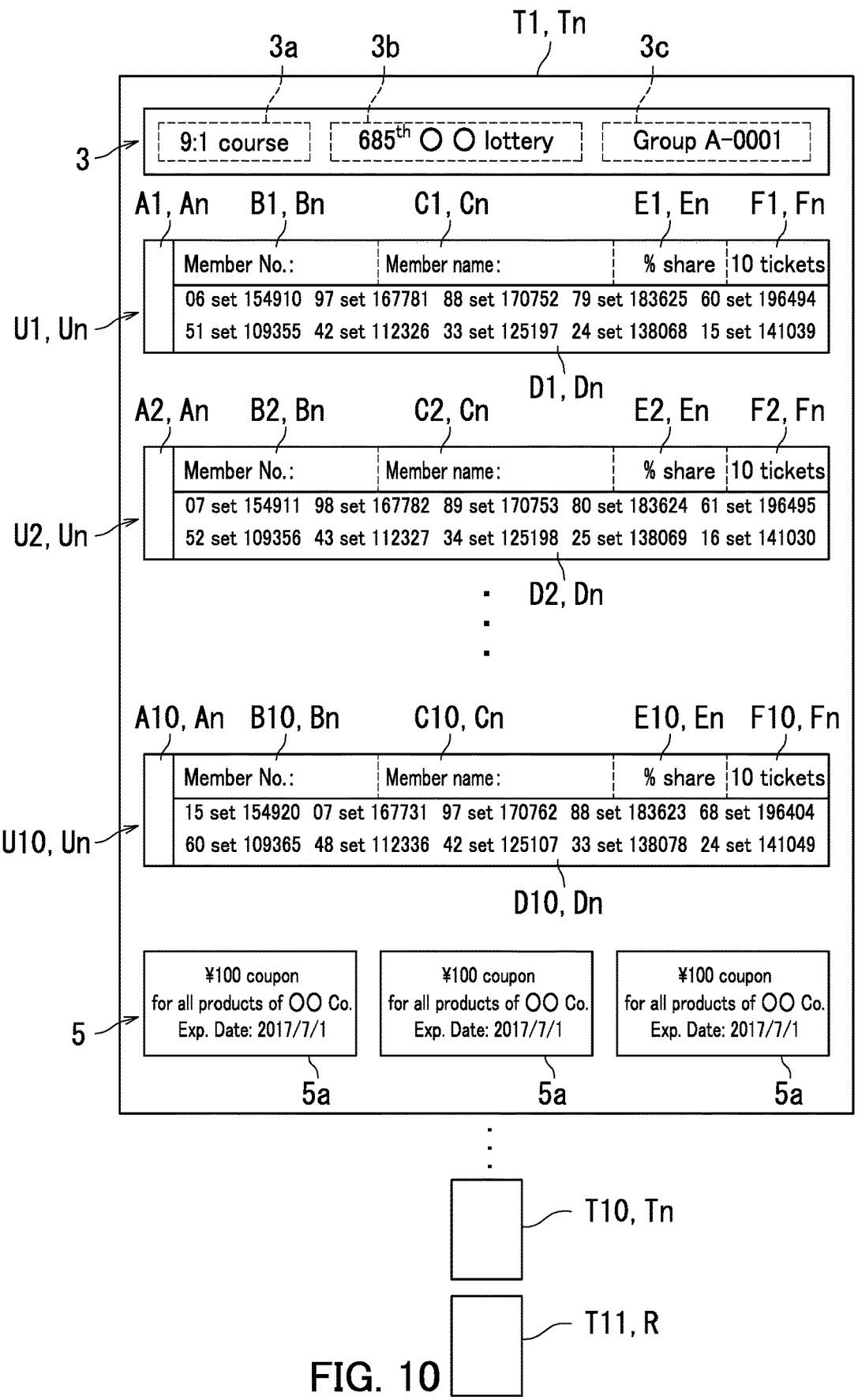
FIG. 10 is a diagram illustrating first through eleventh share tables under creation according to the first embodiment.

FIG. 9 is a flowchart illustrating another part of the share table issuance method. FIG. 10 is a diagram illustrating the first through eleventh share tables T1 to T11. For simplification of FIG. 10, the second through ninth share tables T2 to T9 are omitted and the tenth share table T10 and the eleventh share table T11 are downsized with details thereof omitted.

As illustrated in FIG. 9, the share table issuance method further includes Steps S19 to S29 and is performed by the controller 10 of the share table issuance device 1.

As illustrated in FIGS. 9 and 10, at Step S19, the copying section 15 makes (N+1) copies, that is, 11 copies of the share table form P to create the first through eleventh share tables T1 to T11. Specifically, the copying section 15 makes copies of the share table form P in a state right after completion of Step S17 in FIG. 6. The copying section 15 then deletes the share table form P from the group area 26. Note that the example illustrated in FIG. 10 includes the coupon unit 5 (Yes at Step S3 in FIG. 6).

Since the first through eleventh share tables T1 to T11 are created by copying the share table form P, writing into the share table form P is substantially equivalent to writing into the first through eleventh share tables T1 to T11.

At Step S21, the marking section 16 marks the n-th unit Un of the n-th share table Tn. Specifically, the marking section 16 marks the first unit U1 of the first share table T1, . . . , and the tenth unit U10 of the tenth share table T10.

At Step S23, the marking section 16 writes, in each of the first through tenth share tables T1 to T10, identification information items of the first through tenth units U1 to U10 in the first through tenth unit identification fields A1 to A10, respectively. The identification information items of the first through tenth units U1 to U10 are consecutive numbers from "1" to "10", respectively, in the first embodiment. The marking section 16 also writes, in the eleventh share table T11, the identification information items of the first through tenth units U1 to U10 in the first through tenth unit identification fields A1 to A10, respectively. Further, the marking section 16 decorates the marked n-th unit identification field An.

At Step S25, the share writing section 17 writes the main share, that is, "90" in the marked n-th share field En. Specifically, the share writing section 17 writes the main share in each of the marked first share field E1 of the first share table T1, . . . , and the tenth share field E10 of the tenth share table T10. Also, the marking section 16 decorates the marked n-th share field En and the marked n-th ticket quantity field Fn.

At Step S27, the share writing section 17 writes, in each of the first through tenth share tables T1 to T10, the sub share, that is, "10" in each of share fields other than the marked n-th share field En among the first through tenth share fields E1 to E10. For example, the share writing section 17 writes, in the first share table T1, the sub share, that is, "10" in each of the second through tenth share fields E2 to E10 other than the first share field E1.

Through the above Steps S25 and S27, the shares are written in the first through tenth share fields E1 to E10. That is, the share writing section 17 writes in the first through tenth share fields E1 to E10 of each of the first through tenth share tables T1 to T10, shares of money for cases where the money is given to lottery tickets allocated to the first through tenth ticket fields D1 to D10, respectively.

At Step S29, the share writing section 17 writes the main share, that is, "90" in each of the first through tenth share fields E1 to E10 of the (N+1)-th share table T(N+1), that is, the eleventh share table T11. Also, the marking section 16 decorates: the first through tenth unit identification fields A1 to A10 of the eleventh share table T11; the first through tenth share fields E1 to E10 of the eleventh share table T11; and the first through tenth ticket quantity fields F1 to F10 of the eleventh share table T11. Note that in a case where the eleventh share table T11 includes the coupon unit 5, the marking section 16 may delete the coupon unit 5 from the eleventh share table T11.

The (N+1)-th share table T(N+1), that is, the eleventh share table T11 is created as the member list R.

As described above with reference to FIGS. 5 to 10, the share table issuance device 1 creates the first through tenth share tables T1 to T10 and the member list R for course C1 and causes the created share tables T1 to T10 and member list R to be stored in the group area 26 of the course area 25 corresponding to course C1.

Similarly, the share table issuance device 1 performs the share table issuance method to create the first through tenth share tables T1 to T10 and the member list R for course C2 and causes the created share tables T1 to T10 and member list R to be stored in the group area 26 of the course area 25 corresponding to course C2. Similarly, the share table issuance device 1 performs the share table issuance method to create the first through tenth share tables T1 to T10 and the member list R for course C3 and causes the created share tables T1 to T10 and member list R to be stored in the group area 26 of the course area 25 corresponding to course C3.

However, the first through tenth share tables T1 to T10 and the member list R for courses C1 to C3 are uncompleted even upon completion of Step S29 in FIG. 9.

Figure 11:
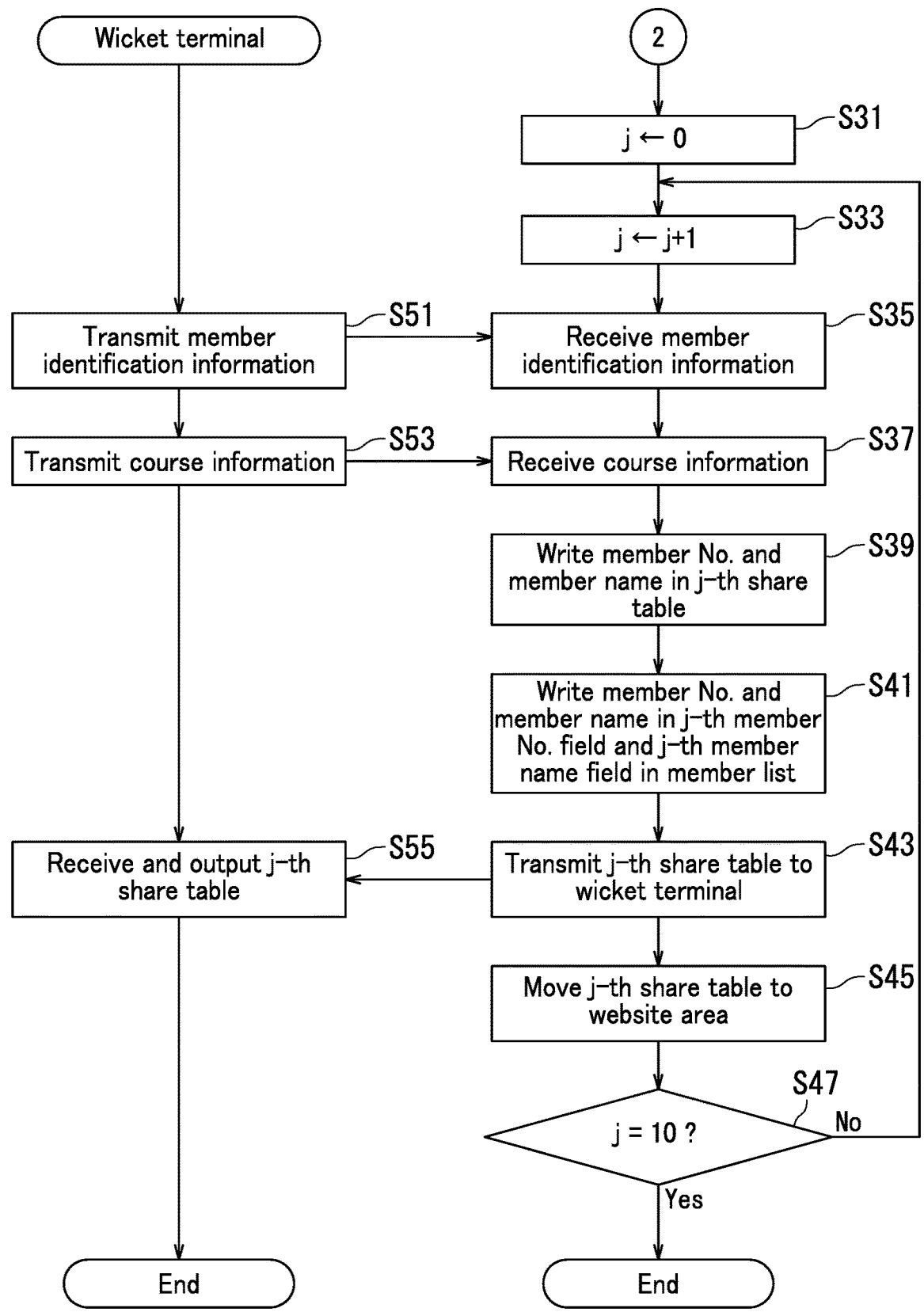
FIG. 11 is a flowchart illustrating yet another part of the share table issuance method according to the first embodiment.

Therefore, after Step S29, the routine proceeds to Step S31 in FIG. 11.

Figure 12:
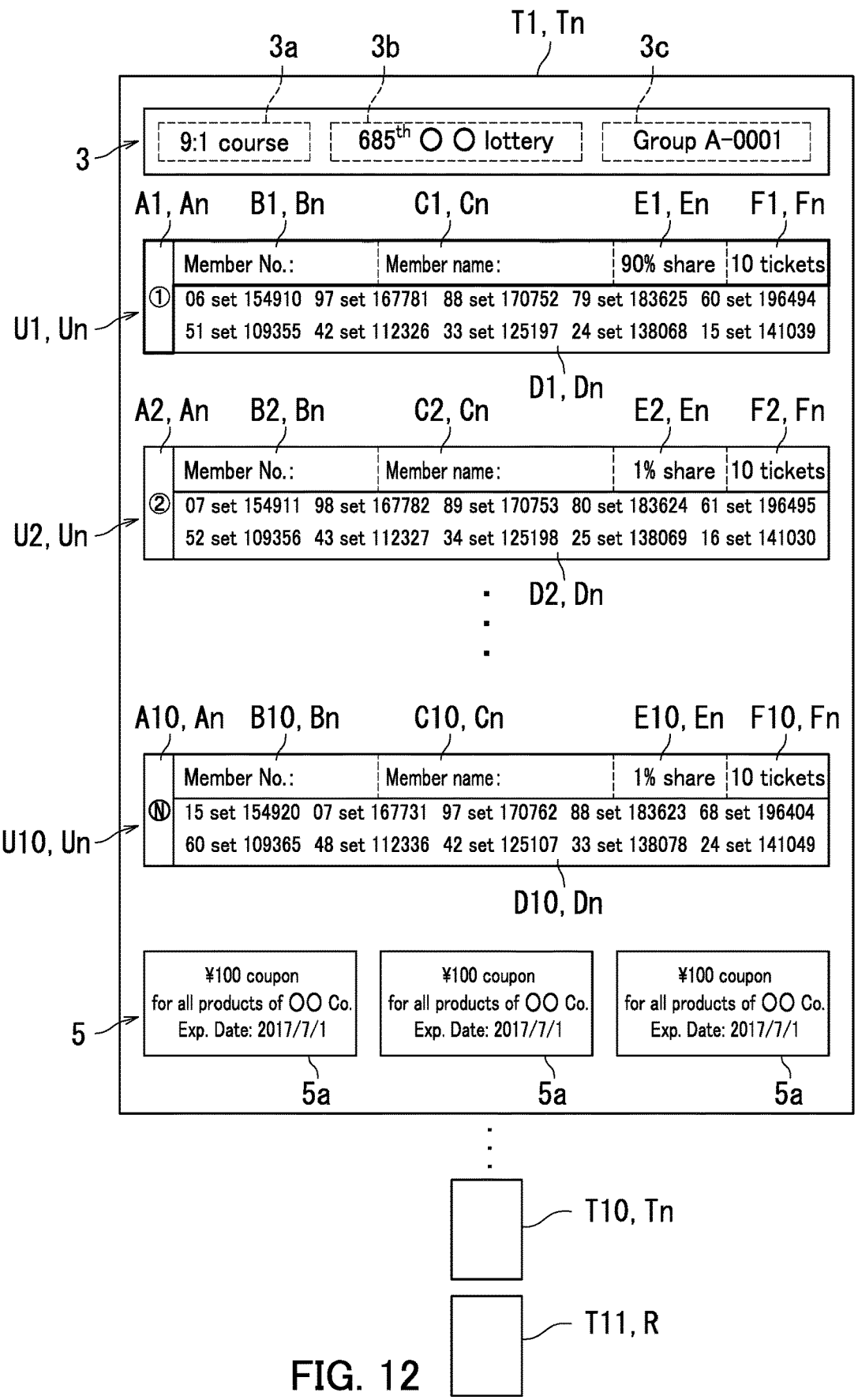
FIG. 12 is a diagram illustrating the first through tenth share tables and the member list under creation according to the first embodiment.

FIG. 11 is a flowchart illustrating yet another part of the share table issuance method. FIG. 11 also includes a flowchart illustrating an application method performed by the wicket terminal 200. The application method according to the first embodiment refers to an application method for group purchase of lottery tickets. FIG. 12 is a diagram illustrating the first through tenth share tables T1 to T10 and the member list R in a state right after completion of Step S29 in FIG. 9. For simplification of FIG. 12, the second through ninth share tables T2 to T9 are omitted and the tenth share table T10 and the member list R are downsized with details thereof omitted.

As illustrated in FIG. 11, the share table issuance method further includes Steps S31 to S47 and is performed by the controller 10 of the share table issuance device 1. The application method includes Steps S51 to S55 and is performed by the wicket terminal 200.

As illustrated in FIG. 11, at Step S31, the controller 10 assigns 0 to a variable j.

At Step S33, the controller 10 increments the variable j by one.

At Step S51, the wicket terminal 200 transmits identification information of a member to the share table issuance device 1 through the network NW. For example, a member card with the identification information of the member stored therein may be inserted by a person in charge of a wicket into a card reader included in the input section 200a to transmit the identification information of the member. Further, an operation screen may be displayed in the wicket terminal 200.

At Step S35, the controller 10 receives the identification information of the member through the network NW and the communication device 30. The controller 10 then accesses the member area 21 of the storage 20 based on the identification information of the member. The controller 10 acquires from the member area 21 a member number and a member name corresponding to the identification information of the member and causes the acquired member number and member name to be stored in the storage 20. Note that the identification information of the member may indicate the member number.

At Step S53, the wicket terminal 200 transmits course information to the share table issuance device 1 through the network NW. The course information indicates any of courses C1 to C3. Specifically, the course information is input to the wicket terminal 200 through the input section 200a thereof and transmitted to the share table issuance device 1. For example, the person in charge of the wicket may input the course information by operating the operation screen displayed in the wicket terminal 200 according to the member's request.

At Step S37, the controller 10 receives the course information through the network NW and the communication device 30. The controller 10 then reads the j-th share table Tj and the member list R from a course area 25 corresponding to a course indicated by the course information. Further, the controller 10 executes processing at Steps S39 to S47 on the j-th share table Tj and the member list R. The following describes a situation in which the course information indicates course C1.

As illustrated in FIGS. 11 and 12, at Step S39, the member writing section 18 of the controller 10 writes the member number corresponding to the identification information of the member in each of the first through tenth member number fields B1 to B10 included in the j-th share table Tj. Also, the member writing section 18 writes the member name corresponding to the identification information of the member in each of the first through tenth member name fields C1 to C10 included in the j-th share table Tj. Also, the marking section 16 decorates the j-th member number field Bj and the j-th member name field Cj, which are marked, in the j-th share table Tj. The j-th share table Tj is completed upon completion of Step S39. For example, when j=1, the first share table T1 (N=10) illustrated in FIG. 3 is completed.

At Step S41, the member writing section 18 writes the member number corresponding to the identification information of the member in the j-th member number field Bj included in the member list R. Also, the member writing section 18 writes the member name corresponding to the identification information of the member in the j-th member name field Cj included in the member list R. Also, the marking section 16 decorates the j-th member number field Bj and the j-th member name field Cj of the member list R.

At Step S43, the controller 10 transmits the j-th share table Tj to the wicket terminal 200.

At Step S55, the wicket terminal 200 receives the j-th share table Tj. The wicket terminal 200 then displays the j-th share table Tj. Further, the wicket terminal 200 outputs the j-th share table Tj as a paper medium.

Note that the person in charge of the wicket may press a "confirmation button" on the operation screen so that confirmation information is transmitted from the wicket terminal 200 to the share table issuance device 1. The share table issuance device 1 may transmit the j-th share table Tj to the wicket terminal 200 after receiving the confirmation information.

At Step S45, the controller 10 moves the j-th share table Tj from the group area 26 to the website area 22 and causes the j-th share table Tj to be stored in the website area 22. Therefore, the j-th member can view and print the j-th share table Tj by accessing his or her member page through the member terminal 300.

At Step S47, it is determined whether or not the variable j is "10", that is, whether or not writing into all of the first through tenth share tables T1 to T10 is completed. When negative determination is made (No at Step S47), the routine proceeds to Step S33. By contrast, when positive determination is made (Yes at Step S47), the processing ends. When positive determination (Yes) is made at Step S47, the member list R is completed. For example, the member list R (N=10) illustrated in FIG. 4 is completed.

Note that the wicket terminal 200 performs Steps S51 to S55 as described with reference to FIG. 11. However, Steps S51 to S55 may be performed by the member terminal 300. In this case, for example the member selects a course by logging into a website of the administrator through the member terminal 300 so that the course information is transmitted to the share table issuance device 1. Further, the member presses a "confirmation button" on an operation screen displayed in the member terminal 300 so that confirmation information is transmitted from the member terminal 300 to the share table issuance device 1. The share table issuance device 1 transmits the j-th share table Tj to the member terminal 300 after receiving the confirmation information.

As described above with reference to FIGS. 5 to 12, the share table issuance method according to the first embodiment issues the first through N-th share tables T1 to TN. Therefore, the first through N-th members can accurately recognize the main share and the sub share by seeing the first through N-th share fields E1 to EN. In addition, the first through N-th members can accurately recognize main lottery tickets and sub lottery tickets by seeing the first through N-th ticket fields D1 to DN.

Further, according to the first embodiment, the first through N-th share tables T1 to TN and the member list R can be efficiently issued using the share table form P. Also, the first through N-th share tables T1 to TN can be issued quickly to the same groups or different groups by using the share table form P.

Further, according to the first embodiment, the storage 20 (storage medium) is capable of storing therein a computer program that causes the controller 10 (computer) to perform the share table issuance method (Steps S1 to S47). That is, the computer program causes the controller 10 to perform the share table issuance method.

Figure 13:
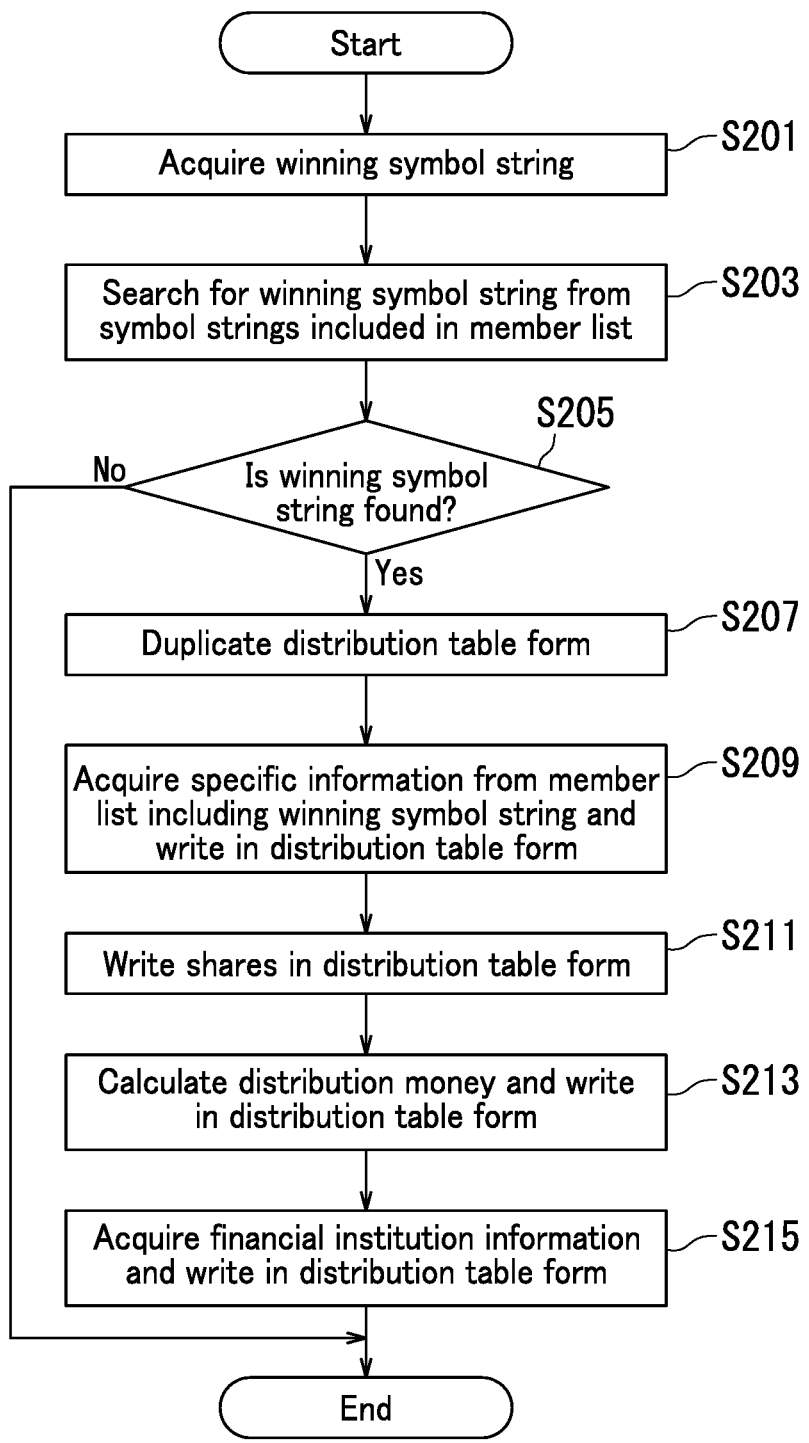
FIG. 13 is a flowchart illustrating a distribution table creation method according to the first embodiment.

The following describes a distribution table creation method with reference to FIGS. 4, 5, 8, and 13. FIG. 13 is a flowchart illustrating the distribution table creation method according to the first embodiment. As illustrated in FIG. 13, the distribution table creation method includes Steps S201 to S215 and is performed by the controller 10 of the share table issuance device 1.

At Step S201, the distribution table creation section 19 of the controller 10 acquires a winning symbol string (for example, winning number) of a lottery ticket. The winning symbol string is a symbol string that has won a prize. The winning symbol string is for example input through the input section 400a of the administrator terminal 400 and transmitted from the administrator terminal 400 to the share table issuance device 1. The distribution table creation section 19 acquires the winning symbol string. Alternatively, the distribution table creation section 19 acquires the winning symbol string for example from a website on the network NW.

At Step S203, the distribution table creation section 19 searches for the winning symbol string from among a plurality of symbol strings written in the first through N-th ticket fields D1 to DN included in the member list R. The search is performed on one or more member lists R stored in the storage 20.

At Step S205, the distribution table creation section 19 determines whether or not the winning symbol string is found in the symbol strings, that is, whether or not the winning symbol string is included in the symbol strings. When negative determination is made (No at Step S205), the processing ends. By contrast, when positive determination is made (Yes at Step S205), the routine proceeds to Step S207.

At Step S207, the distribution table creation section 19 duplicates the distribution table form Q. The distribution table creation section 19 causes the duplicate of the distribution table form Q to be stored in a group area 26 corresponding to a member list R in which the winning symbol string is written. The group area 26 corresponding to the member list R refers to a group area 26 corresponding to group identification information written in the group field 3c of the member list R.

At Step S209, the distribution table creation section 19 acquires specific information from the member list R in which the winning symbol string is written and writes the specific information in the distribution table form Q. Also, the distribution table creation section 19 writes identification information items of the first through tenth unit identification fields A1 to A10 of the member list R in the first through tenth identification fields G1 to G10 of the distribution table form Q, respectively.

Specifically, the distribution table creation section 19 acquires: information indicating a course from the course field 3a of the member list R; information indicating a type of lottery tickets from the ticket type field 3b of the member list R; and the group identification information from the group field 3c of the member list R. The distribution table creation section 19 then writes the course, the type of the lottery tickets, and the group identification information in the distribution-use course field 50a, the distribution-use ticket type field 50b, and the distribution-use group field 50c of the distribution table form Q, respectively. Also, the distribution table creation section 19 acquires member numbers of the first through tenth members from the first through tenth member number fields B1 to B10 of the member list R and writes the member numbers in the first through tenth distribution-use member number fields H1 to H10 of the distribution table form Q, respectively. Further, the distribution table creation section 19 acquires member names of the first through tenth members from the first through tenth member name fields C1 to C10 of the member list R and writes the member names in the first through tenth distribution-use member name fields L1 to L10 of the distribution table form Q, respectively.

At step S211, the distribution table creation section 19 writes shares in the first through tenth distribution-use share fields M1 to M10 of the distribution table form Q, respectively.

Specifically, the distribution table creation section 19 identifies a ticket field in which the winning symbol string is written from among the first through tenth ticket fields D1 to D10 of the member list R. Also, the distribution table creation section 19 identifies a member number field corresponding to the identified ticket field from among the first through tenth member number fields B1 to B10 of the member list R. The distribution table creation section 19 then writes a main share specified by the course written in the distribution-use course field 50a. The distribution table creation section 19 writes the main share in a distribution-use share field corresponding to a member number written in the identified member number field of the member list R among the first through tenth distribution-use share fields M1 to M10. That is, the distribution table creation section 19 writes the main share in a distribution-use share field corresponding to a winning member among the first through tenth members. The winning member is a member to whom a main lottery ticket to which the winning symbol string is given is allocated.

Also, the distribution table creation section 19 writes a sub share specified by the course written in the distribution-use course field 50a. The distribution table creation section 19 writes the sub share in each of distribution-use share fields other than the distribution-use share field in which the main share is written among the first through tenth distribution-use share fields M1 to M10. That is, the distribution table creation section 19 writes the sub share in each of distribution-use share fields corresponding to members other than the winning member among the first through tenth members.

At Step S213, the distribution table creation section 19 calculates distribution money for each of the first through tenth members and writes the distribution money in each of the first through tenth distribution-use money fields V1 to V10 of the distribution table form Q.

Specifically, the distribution table creation section 19 acquires information indicating a won prize class and prize money. The information indicating the won prize class and the prize money is for example input through the input section 400a of the administrator terminal 400 and transmitted from the administrator terminal 400 to the share table issuance device 1. The distribution table creation section 19 acquires the information indicating the won prize class and the prize money. Alternatively, the distribution table creation section 19 acquires the information indicating the won prize class and the prize money for example from a website on the network NW. The distribution table creation section 19 writes the won prize class and the prize money in the prize class field 50d and the money field 50e, respectively.

Further, the distribution table creation section 19 calculates distribution money corresponding to the main share based on the prize money and the main share. The distribution table creation section 19 writes the calculated distribution money in a distribution-use money field corresponding to the member number written in the identified member number field of the member list R among the first through tenth distribution-use money fields V1 to V10. That is, the distribution table creation section 19 writes the distribution money corresponding to the main share in a distribution-use money field corresponding to the winning member among the first through tenth members.

Further, the distribution table creation section 19 calculates distribution money corresponding to the sub share based on the prize money and the sub share. The distribution table creation section 19 writes the calculated distribution money in each of distribution-use money fields other than the distribution-use money field in which the distribution money corresponding to the main share is written among the first through tenth distribution-use money fields V1 to V10. That is, the distribution table creation section 19 writes the distribution money corresponding to the sub share in each of distribution-use money fields corresponding to members other than the winning member among the first through tenth members.

Further, the distribution table creation section 19 writes a third party's share as the free allocation in the distribution field 60a. Also, the distribution table creation section 19 calculates distribution money corresponding to the third party's share as the free allocation based on the third party's share as the free allocation and the prize money. The distribution table creation section 19 then writes the calculated distribution money in the distribution money field 60b.

At Step S215, the distribution table creation section 19 acquires financial institution information items for the first through tenth members from the member area 21 of the storage 20. The distribution table creation section 19 writes the financial institution information items for the first through tenth members in the first through tenth financial institution fields W1 to W10, respectively. Also, the distribution table creation section 19 acquires a financial institution information item for the third party from the storage 20. The distribution table creation section 19 then writes the financial institution information item for the third party in the third party field 60c. Upon completion of Step S215, the distribution table form Q is completed as a distribution table.

Note that the controller 10 performs payment processing for the distribution money written in each of the first through tenth distribution-use money fields V1 to V10 and the distribution money field 60b based on the financial institution information items written in the first through tenth financial institution fields W1 to W10 and the third party field 60c.

As described above with reference to FIG. 13, according to the first embodiment, the distribution table creation section 19 searches for the winning symbol string from among the plurality of symbol strings written in the member list R. When the winning symbol string is found in the plurality of symbol strings, the distribution table creation section 19 calculates distribution money based on the main share and the sub share. As a result, the distribution table can be easily created based on the member list R.

Also, according to the first embodiment, the storage 20 is capable of storing therein a computer program that causes the controller 10 to perform the distribution table creation method (Steps S201 to S215). That is, the computer program causes the controller 10 to perform the distribution table creation method.

Second Embodiment

A share table issuance device 1 according to the second embodiment of the present invention will be described with reference to FIGS. 1, 5, 6, 9, 14, and 15. As illustrated in FIG. 1, the configuration of a share table issuance system 100 according to the second embodiment is similar to that of the share table issuance system 100 according to the first embodiment. Also, as illustrated in FIG. 5, the configuration of the share table issuance device 1 according to the second embodiment is similar to that of the share table issuance device 1 according to the first embodiment.

However, unlike the share table issuance device 1 according to the first embodiment that issues share tables for group purchase of regular lottery tickets, the share table issuance device 1 according to the second embodiment issues share tables for group purchase of number selection lottery tickets (number selection draw tickets). The following mainly describes difference between the first and second embodiments.

First, a number selection lottery ticket will be explained. A number selection lottery ticket is a lottery ticket with a symbol string thereon selected by a purchaser (member in the second embodiment). Therefore, the symbol string on the number selection lottery ticket is determined after sale thereof. Either of manual input and automatic input can be selected as a method for inputting a symbol string to be given to the number selection lottery ticket. In the case of manual input, the symbol string is manually input through the input section 200a of the wicket terminal 200 or the input section 300a of the member terminal 300. In the case of automatic input, a computer (for example, the wicket terminal 200, the member terminal 300, or the share table issuance device 1) generates the symbol string.

In one example of the number selection lottery ticket, the purchaser selects a second specific number of different numerals (for example, 7 numerals) from a first specific number of different numerals (for example, 37 numerals). The first specific number is greater than the second specific number. For example, the following numerals "3", "4", "9", "11", "19", "21", and "36" are selected. That is, a symbol string "4 9 11 19 21 36" is selected.

In another example of the number selection lottery ticket, the purchaser selects a numeral of a specific number of digits (for example, 4-digit numeral) from numerals of the specific number of digits (for example, 0000 to 9999). The specific number of digits is greater than one. For example, a numeral "3491" is selected from numerals "0000" to "9999". That is, a symbol string "3491" is selected.

Figure 14:
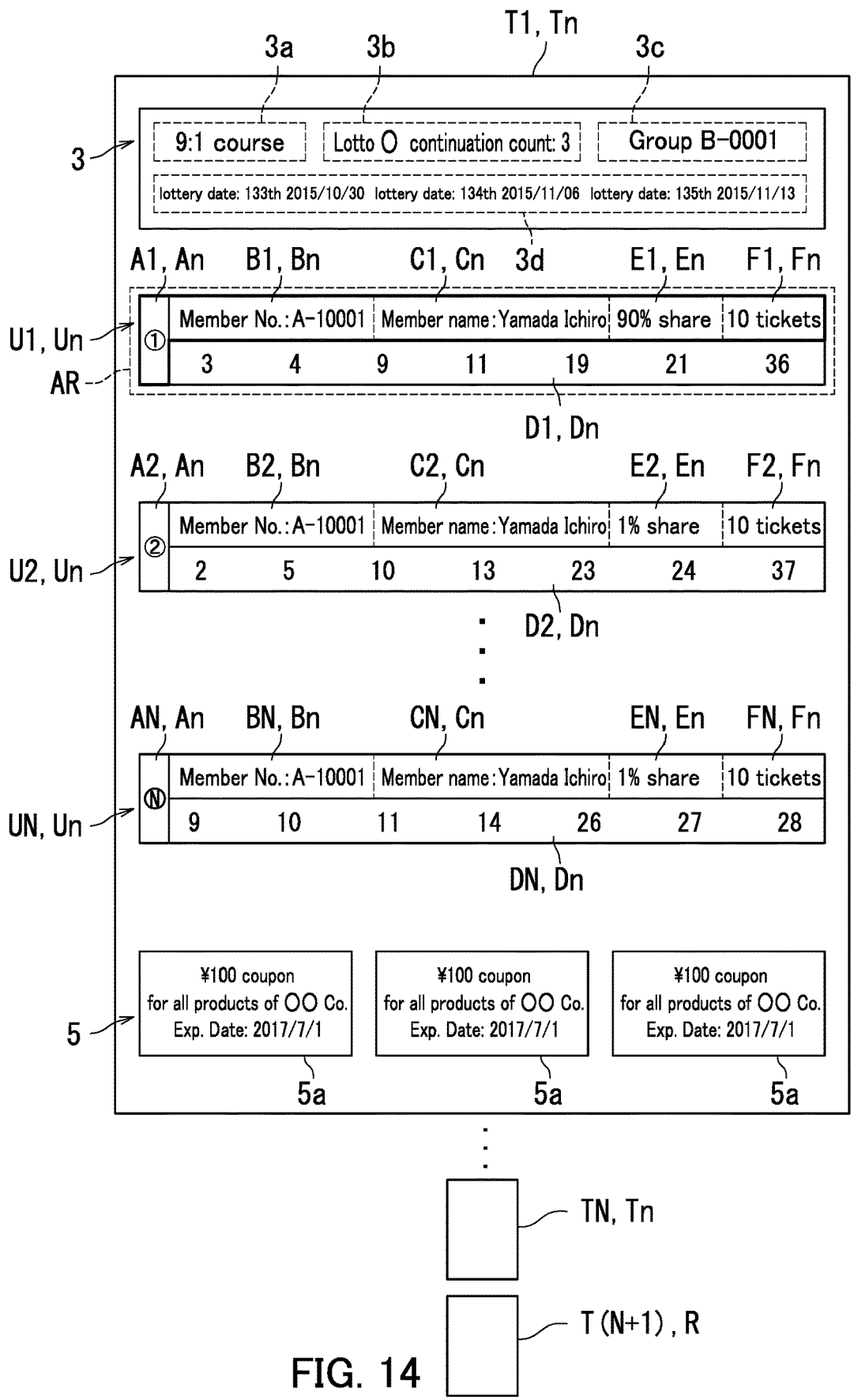
FIG. 14 is a diagram illustrating first through tenth share tables and a member list according to a second embodiment of the present invention.

The following describes first through N-th share tables T1 to TN and a member list R according to the second embodiment with reference to FIG. 14. FIG. 14 is a diagram illustrating the first through N-th share tables T1 to TN and the member list R. For simplification of FIG. 14, the second through (N−1)-th share tables T2 to T(N−1) are omitted and the N-th share table TN and the member list R are downsized with details thereof omitted.

As illustrated in FIG. 14, the configuration of each of the first through N-th share tables T1 to TN is similar to that of the first through N-th share tables T1 to TN according to the first embodiment. However, the second embodiment applies to group purchase of number selection lottery tickets. Accordingly, the configuration of each of the first through N-th share tables T1 to TN is adapted for the rule of the number selection lottery tickets.

That is, a type (type and continuation count) of lottery tickets is written in the ticket type field 3b of the title unit 3. Also, the title unit 3 further includes a lottery date field 3d. Lottery dates corresponding to a continuation count of lottery are written in the lottery date field 3d.

Symbol strings to be given to lottery tickets are each input to the wicket terminal 200 or the member terminal 300. The symbol string writing section 14 of the share table issuance device 1 acquires the symbol strings to be given to the lottery tickets from the wicket terminal 200 or the member terminal 300 through the network NW and the communication device 30. The symbol string writing section 14 then writes the symbol strings acquired from the wicket terminal 200 or the member terminal 300 in the first through tenth ticket fields D1 to D10 included in the first through tenth share tables T1 to T10.

The configuration of the member list R according to the second embodiment is similar to that of the member list R according to the first embodiment. However, the type (type and continuation count) of lottery tickets is written in the ticket type field 3b included in the member list R according to the second embodiment. Also, the title unit 3 included in the member list R according to the second embodiment further includes the lottery date field 3d.

The following describes a share table issuance method according to the second embodiment with reference to FIGS. 6, 9, 14, and 15. The share table issuance method according to the second embodiment is similar to the share table issuance method described with reference to FIGS. 6 and 9. However, the share table issuance method according to the second embodiment does not include Steps S13 to S17 in FIG. 6. Also, the share table issuance method according to the second embodiment includes Steps S61 to S81 illustrated in FIG. 15 in place of Steps S31 to S47 described with reference to FIG. 11. Also, an application method according to the second embodiment includes Steps S91 to S101 illustrated in FIG. 15 in place of Steps S51 to S55 described with reference to FIG. 11.

Figure 15:
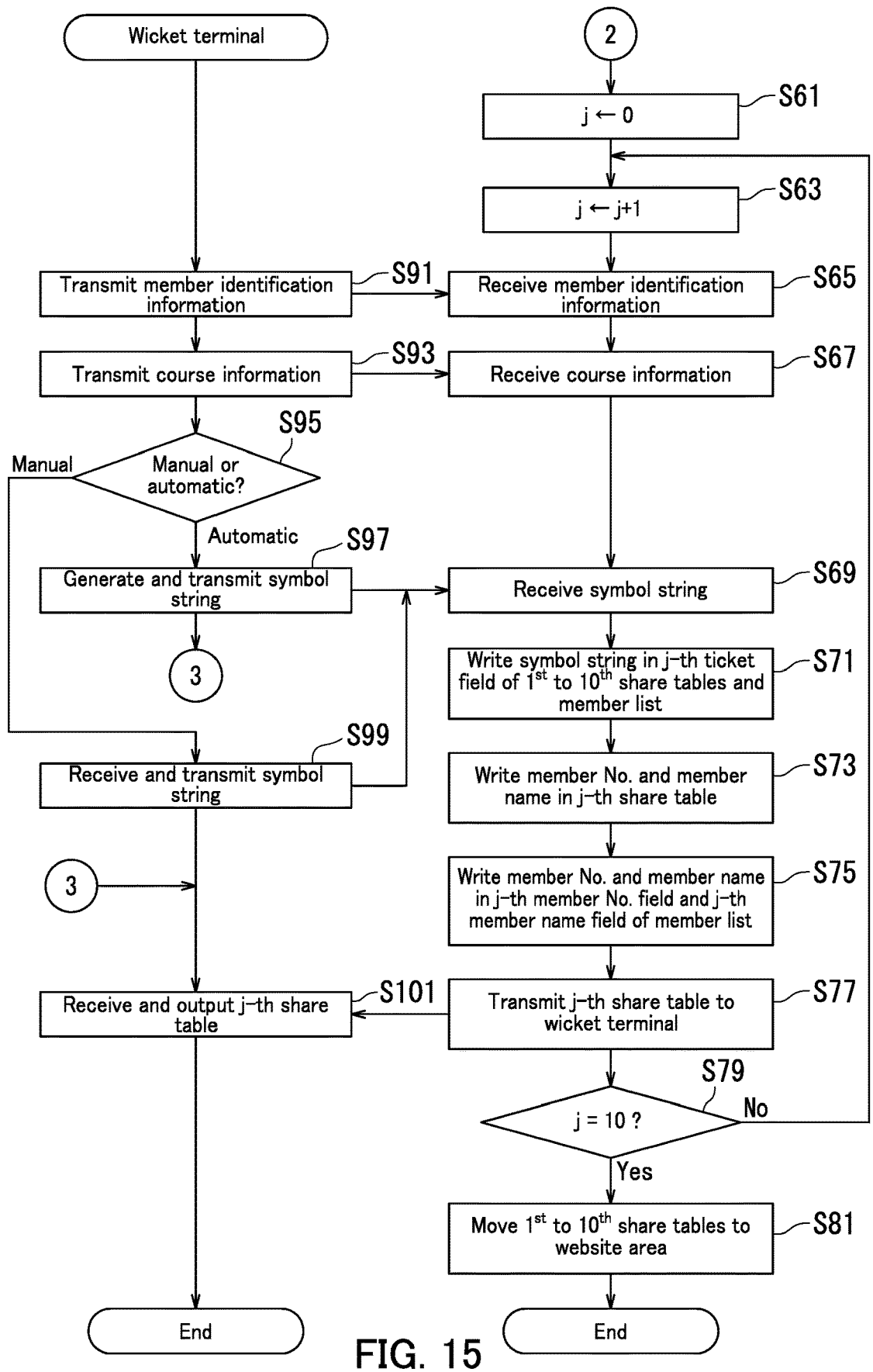
FIG. 15 is a flowchart illustrating a share table issuance method according to the second embodiment.

FIG. 15 is a flowchart illustrating the share table issuance method according to the second embodiment. As illustrated in FIG. 15, the share table issuance method further includes Steps S61 to S81 and is performed by the controller 10 of the share table issuance device 1. Processing at Steps S61 to S67 is similar to processing at Steps S31 to S37 in FIG. 11, respectively. Therefore, explanation of the processing at Steps S61 to S67 will be omitted. Also, the application method includes Steps S91 to S101 and is performed by the wicket terminal 200. Processing at Steps S91 and S93 is similar to processing at Steps S51 and S53 in FIG. 11, respectively. Therefore, explanation of the processing at Steps S91 and S93 will be omitted.

As illustrated in FIG. 15, at Step S95, the wicket terminal 200 determines which of manual input and automatic input is selected as a method for inputting a symbol string to be given to a lottery ticket.

When it is determined that automatic input is selected, the routine proceeds from Step S95 to Step S97.

At Step S97, the wicket terminal 200 generates the symbol string in accordance with a specific algorithm. The wicket terminal 200 then transmits the symbol string to the share table issuance device 1 through the network NW. Note that the wicket terminal 200 may transmit an instruction for generating the symbol string to the share table issuance device 1 and cause the share table issuance device 1 (for example, the symbol string writing section 14) to generate the symbol string.

By contrast, when it is determined that manual input is selected, the routine proceeds from Step S95 to Step S99.

At Step S99, the wicket terminal 200 receives input of the symbol string through the input section 200a. The wicket terminal 200 then transmits the symbol string to the share table issuance device 1 through the network NW.

At Step S69, the controller 10 receives the symbol string through the network NW and the communication device 30.

At Step S71, the symbol string writing section 14 of the controller 10 writes the symbol string in the j-th ticket field Dj of each of the first through tenth share tables T1 to T10 and the member list R.

At Step S73, the member writing section 18 writes a member number corresponding to identification information of a member in each of the first through tenth member number fields B1 to B10 included in the j-th share table Tj. Also, the member writing section 18 writes a member name corresponding to the identification information of the member in each of the first through tenth member name fields C1 to C10 included in the j-th share table Tj. Note that the processing at Step S73 is similar to the processing at Step S39 in FIG. 11.

At Step S75, the member writing section 18 writes the member number corresponding to the identification information of the member in the j-th member number field Bj included in the member list R. Also, the member writing section 18 writes the member name corresponding to the identification information of the member in the j-th member name field Cj included in the member list R. Note that the processing at Step S75 is similar to the processing at Step S41 in FIG. 11.

At Step S77, the controller 10 transmits the j-th share table Tj to the wicket terminal 200. Also, the controller 10 makes copies of the first through tenth share tables T1 to T10 and causes the copies to be stored in the website area 22. Therefore, the first through tenth members can view and print the first through tenth share tables T1 to T10, respectively, by accessing their member pages through their member terminals 300. That is, even before completion of the first through tenth share tables T1 to T10, the first through tenth members can view and print the first through tenth share tables T1 to T10, respectively. Note that overwriting is performed with the copies of the first through tenth share tables T1 to T10 in the website area 22.

At Step S101, the wicket terminal 200 receives the j-th share table Tj. The wicket terminal 200 then outputs the j-th share table Tj as a paper medium.

At Step S79, it is determined whether or not the variable j is "10", that is, whether or not writing into all of the first through tenth share tables T1 to T10 is completed. When negative determination is made (No at Step S79), the routine proceeds to Step S63. By contrast, when positive determination is made (Yes at Step S79), the routine proceeds to Step S81. When positive determination (Yes) is made at Step S79, the first through tenth share tables T1 to T10 and the member list R are completed. For example, the first through tenth share tables T1 to T10 and the member list R (N=10) illustrated in FIG. 14 are completed.

At Step S81, the controller 10 moves the first through tenth share tables T1 to T10 from the group area 26 to the website area 22 and causes the first through tenth share tables T1 to T10 to be stored in the website area 22. Therefore, the first through tenth members can view and print the completed first through tenth share tables T1 to T10, respectively, by accessing their member pages through their member terminals 300. Note that the copies of the first through tenth share tables T1 to T10 made and stored at Step S77 are deleted from the website area 22.

As described above with reference to FIG. 15, the wicket terminal 200 performs Steps S91 to S101. However, Steps S91 to S101 may be performed by the member terminal 300.

As described above with reference to FIGS. 1, 5, 6, 9, 14, and 15, the share table issuance device 1 and the share table issuance method according to the second embodiment have configurations similar to those of the share table issuance device 1 and the share table issuance method according to the first embodiment and issue the first through N-th share tables T1 to TN. As a result, similarly to the first embodiment, the first through N-th members can accurately recognize the main share and the sub share by seeing the first through N-th share fields E1 to EN according to the second embodiment. In addition, the first through N-th members can accurately recognize the main lottery ticket and the sub lottery tickets by seeing the first through N-th ticket fields D1 to DN. Furthermore, effects similar to those achieved by the first embodiment are achieved by the second embodiment.

Also, according to the second embodiment, the first through N-th share tables T1 to TN can be easily issued even when objects of group purchase are number selection lottery tickets as described with reference to FIG. 15. Specifically, even when objects of group purchase are number selection lottery tickets, the first through N-th share tables T1 to TN can be easily issued by the symbol string writing section 14 acquiring symbol strings from the wicket terminal 200 or the member terminal 300.

Further, according to the second embodiment, the storage 20 is capable of storing therein computer programs that cause the controller 10 to perform the share table issuance method (Steps S1 to S11, Steps S19 to S29, and Steps S61 to S81) and the distribution table creation method (Steps S201 to S215). That is, the computer programs cause the controller 10 to perform the share table issuance method and the distribution table creation method.

Through the above, the embodiments of the present invention have been described with reference to the drawings. However, the present invention is not limited to the above embodiments and may be practiced in various manners within a scope not departing from the gist of the present invention (for example, as described below in (1) to (11)). Also, it is possible to make various inventions by appropriately combining elements disclosed in the above embodiments. For example, it is possible to eliminate some elements from all the elements described in the embodiments. Further, elements described in different embodiments may be appropriately combined. The drawings schematically illustrate elements of configuration in order to facilitate understanding. Thickness, length, and the number of the elements of configuration, and space therebetween illustrated in the drawings may differ from actual ones in order to facilitate preparation of the drawings. Also, material, shape, dimensions, and the like of elements of configuration described in the above embodiments are merely examples and not intended as specific limitations. Various alterations can be made within a scope not substantially departing from effects of the present invention.

(1) In the first and second embodiments, timing of payment of a participation cost for group purchase including the price of lottery tickets is as follows. That is, in a situation in which a member applies for the group purchase through the wicket terminal 200, the member pays the participation cost when the member receives the n-th share table Tn. In a situation in which a member applies for the group purchase through the member terminal 300, the participation cost according to the number of units of application is automatically withdrawn or transferred from an account at the beginning of application, and thereafter the member proceeds to an application procedure.

(2) In the second embodiment, timing of purchase of number selection lottery tickets is as follows. In both cases of manual input and automatic input of a symbol string, the share table issuance device 1 performs a procedure for ordering and purchasing lottery tickets through the network NW at the time when the symbol string is written in the n-th share table Tn.

(3) In the first and second embodiments, last place prize money may be distributed to the administrator of the share table issuance device 1. Also, group purchase of lottery tickets may cost or may be free. For example, when the first through N-th share tables T1 to TN are given as gifts to recipients from a gift presenter, group purchase of lottery tickets is free for the recipients. Further, the wicket terminal 200 may be a terminal of the administrator of the share table issuance device 1 or a terminal of another business operator (for example, gift presenter). Further, a person who can make group purchase of lottery tickets is not limited to a member.

(4) Although in the first and second embodiments, the first through N-th member name fields C1 to CN are provided in each of the first through N-th share tables T1 to TN, a single member name field (object person field) may be provided in each of the first through N-th share tables T1 to TN. The symbol string reader 40 may be connected to the wicket terminal 200 or the administrator terminal 400. In this case, the symbol string reader 40 transmits a symbol string to the controller 10 through the wicket terminal 200 or the administrator terminal 400. Alternatively, the symbol string reader 40 may be connected to the network NW. In this case, the symbol string reader 40 transmits a symbol string to the controller 10 through the network NW.

(5) In the first and second embodiments, when the number of members who have made application is smaller than N (10 in the examples of FIGS. 6 to 12 and 15) at the time of elapse of an application period for group purchase, the administrator for example supplements a deficiency to satisfy the number N and completes the first through N-th share tables T1 to TN.

(6) In the second embodiment, automatic input can be selected as a method for inputting a symbol string to be given to a lottery ticket. Therefore, even when objects of group purchase are number selection lottery tickets, all symbol strings can be acquired and written beforehand.

Specifically, the share table issuance device 1 performs processing illustrated in FIGS. 6, 9, and 11. However, the symbol string reader 40 is not used at Step S13 in FIG. 6. In this case, the symbol string writing section 14 selects symbol strings from among symbol strings that can be given to number selection lottery tickets beforehand. That is, the symbol string writing section 14 generates symbol strings to be given to lottery tickets beforehand. For example, the symbol string writing section 14 generates the symbol strings to be given to the lottery tickets in advance before the share table issuance device 1 receives application for group purchase of the lottery tickets from a member through the wicket terminal 200 or the member terminal 300. Then at Step S17, for example, the symbol string writing section 14 writes the symbol strings in the first through tenth ticket fields D1 to D10 in advance before the share table issuance device 1 receives application for the group purchase of the lottery tickets. As a result, the share table issuance device 1 can immediately issue the first through N-th share tables T1 to TN upon application for the group purchase by respective members.

(7) In each of the first through N-th share tables T1 to TN of the first embodiment described with reference to FIG. 3 and the second embodiment described with reference to FIG. 14, the first through N-th ticket fields D1 to DN are arranged in ascending order according to the numbers represented by n and the first through N-th share fields E1 to EN are arranged in correspondence with the first through N-th ticket fields D1 to DN, respectively. Accordingly, in the n-th share table Tn, the n-th ticket field Dn (in which a symbol string of the main lottery ticket is written) and the n-th share field En (in which the main share is written) are arranged the n-th among the first through N-th. That is, the n-th unit Un in which the symbol string of the main lottery ticket and the main share are written is arranged at different positions in the first through N-th share tables T1 to TN.

However, the n-th unit Un may be arranged in the same area in the first through N-th share tables T1 to TN. For example, a specified area AR is defined in each of the first through N-th share tables T1 to TN as illustrated in FIGS. 3 and 14. The specified area AR is located at the same position in all of the first through N-th share tables T1 to TN. In the examples illustrated in FIGS. 3 and 14, in each of the first through N-th share tables T1 to TN, the specified area AR is the topmost area among N areas in which the first through N-th units U1 to UN are arranged. In each of the first through N-th share tables T1 to TN, the n-th unit Un in which the symbol string of the main lottery ticket and the main share are written is arranged in the specified area AR. Specifically, in each of the first through N-th share tables T1 to TN, the n-th ticket field Dn (in which the symbol string of the main lottery ticket is written) and the n-th share field En (in which the main share is written) are arranged in the specified area AR. That is, the n-th ticket field Dn and the n-th share field En included in the n-th share table Tn are arranged in the specified area AR.

(8) In each of the first through N-th share tables T1 to TN of the first embodiment and the second embodiment, the first through N-th units U1 to UN may be arranged in descending order according to the numbers represented by n. Also, although the share table issuance device 1 issues the first through N-th share tables T1 to TN, the member list R, and the distribution table as electronic data, the share tables, the member list, and the distribution table may each be issued as a paper medium.

(9) The present invention is applicable not only to regular lottery tickets and number selection lottery tickets but also to sports promotion lottery tickets, any other types of lottery tickets, or any other types of drawing tickets.

(10) The controller 10 may be implemented by a single computer or a plurality of computers. In a configuration in which the controller 10 is implemented by a plurality of computers, it is not required that the computers are located at the same place so long as the plurality of computers are connected with one another through a network.

(11) When service using the share table issuance device 1 according to the present invention is provided by issuer of draw tickets in parallel with ordinary service of individual purchase (sale), the number of options for enthusiasts of drawing games increases, resulting in an increase in sales of draw tickets.

INDUSTRIAL APPLICABILITY

The present invention relates to a share table issuance device, a share table issuance method, and a storage medium, and has industrial applicability.

REFERENCE SIGNS LIST

1 Share table issuance device
13 Ticket allocation section
14 Symbol string writing section
17 Share writing section
18 Member writing section (object person writing section)
40 Symbol string reader
200 Wicket terminal (terminal)
300 Member terminal (terminal)
NW Network

The invention claimed is:

1. A share table issuance device that issues first through N-th share tables to first through N-th object persons, respectively, N representing an integer equal to or greater than 2, the share table issuance device comprising:
a ticket allocation section;
a symbol string writing section;
a share writing section; and
an object person writing section, wherein
the first through N-th share tables each include first through N-th ticket fields and an object person field,
the ticket allocation section allocates draw tickets different from one another to the first through N-th ticket fields, respectively,
the symbol string writing section writes in the first through N-th ticket fields, symbol strings given to the draw tickets allocated to the first through N-th ticket fields, respectively,
the share writing section writes in each of the first through N-th share tables, shares of money for cases where the money is given to the draw tickets allocated to the first through N-th ticket fields,
the object person writing section writes in the object person fields included in the first through N-th share tables, information items for identifying the first through N-th object persons, respectively,
the shares are determined in accordance with a specific distribution method,
the specific distribution method is a method by which each of the first through N-th object persons acquires a portion of money when the money is given to a draw ticket allocated to him or her and transfers another portion of the money to others,
the shares written in an n-th share table among the first through N-th share tables indicate shares of an n-th object person, n representing an integer of at least 1 and no greater than N,
the same draw ticket is allocated to n-th ticket fields included in the first through N-th share tables, and
with respect to the draw ticket allocated to the n-th ticket fields, a share written in the n-th share table issued to the n-th object person differs from a share written in a k-th share table issued to a k-th object person, k representing an integer of at least 1 and no greater than N and differing from the integer represented by n.

2. The share table issuance device according to claim 1, wherein
the first through N-th share tables each further include first through N-th share fields,
the share writing section writes in the first through N-th share fields, the shares of money for the cases where the money is given to the draw tickets allocated to the first through N-th ticket fields, respectively,
the shares written in the first through N-th share fields included in the n-th share table indicate the shares of the n-th object person, and
the share written in an n-th share field included in the n-th share table issued to the n-th object person differs from the share written in an n-th share field included in the k-th share table issued to the k-th object person.

3. The share table issuance device according to claim 2, wherein
the symbol string writing section, the share writing section, and the object person writing section perform writing into a member list,
the member list includes first through N-th member list-use ticket fields, first through N-th member list-use share fields, and first through N-th member list-use object person fields,
the symbol string writing section writes in the first through N-th member list-use ticket fields, the symbol strings written in the first through N-th ticket fields, respectively,
the share writing section writes in an n-th member list-use share field, the share written in the n-th share field included in the n-th share table, and
the object person writing section writes in the first through N-th member list-use object person fields, the information items for identifying the first through N-th object persons, respectively.

4. The share table issuance device according to claim 2, wherein
the share writing section writes the shares respectively in n-th share fields included in the first through N-th share tables so that a sum of the shares is less than money possibly to be given to the draw ticket allocated to the n-th ticket fields.

5. The share table issuance device according to claim 2, wherein
the draw ticket allocated to the n-th ticket field included in the n-th share table is allocated to the n-th object person, the share written in the n-th share field included in the n-th share table is a share of money for a case where the money is given to the draw ticket allocated to the n-th object person, draw tickets allocated to ticket fields other than the n-th ticket field among the first through N-th ticket fields included in the n-th share table are allocated to object persons other than the n-th object person among the first through N-th object persons, and shares written in share fields other than the n-th share field among the first through N-th share fields included in the n-th share table are shares of the n-th object person for the draw tickets allocated to the object persons other than the n-th object person among the first through N-th object persons.

6. The share table issuance device according to claim 2, further comprising:

a form creation section that creates a share table form; and
a copying section, wherein the share table form includes blank first through N-th ticket fields and blank first through N-th share fields, the ticket allocation section allocates draw tickets different from one another to the first through N-th ticket fields of the share table form, respectively, the symbol string writing section writes in the first through N-th ticket fields of the share table form, symbol strings given to the draw tickets allocated to the first through N-th ticket fields of the share table form, respectively, the copying section makes plural copies of the share table form with the symbol strings written in the first through N-th ticket fields to create first through N-th share tables including the blank first through N-th share fields, and for each of the first through N-th share tables including the blank first through N-th share fields, the share writing section writes in the blank first through N-th share fields, shares of money for cases where the money is given to the draw tickets allocated to the first through N-th ticket fields, respectively.

7. The share table issuance device according to claim 1, further comprising a symbol string reader that reads the symbol strings, the symbol strings being printed on the draw tickets, wherein the symbol string writing section acquires the symbol strings from the symbol string reader.

8. The share table issuance device according to claim 1, wherein the symbol strings given to the draw tickets are each input to a terminal connected to a network, and the symbol string writing section acquires each of the symbol strings from the terminal through the network.

9. The share table issuance device according to claim 1, wherein the share tables each further include a coupon field, and the share table issuance device further comprises a coupon writing section that writes a condition for use of a coupon in the coupon field.

10. A non-transitory computer-readable storage medium storing therein a computer program that causes a computer to perform a share table issuance method for issuing first through N-th share tables to first through N-th object persons, respectively, N representing an integer equal to or greater than 2, the first through N-th share tables each including first through N-th ticket fields and an object person field, the share table issuance method comprising:

allocating draw tickets different from one another to the first through N-th ticket fields, respectively;

writing in the first through N-th ticket fields, symbol strings given to the draw tickets allocated to the first through N-th ticket fields, respectively;

writing in each of the first through N-th share tables, shares of money for cases where the money is given to the draw tickets allocated to the first through N-th ticket fields; and writing in the object person fields included in the first through N-th share tables, information items for identifying the first through N-th object persons, respectively, wherein the shares are determined in accordance with a specific distribution method, the specific distribution method is a method by which each of the first through N-th object persons acquires a portion of money when the money is given to a draw ticket allocated to him or her and transfers another portion of the money to others, the shares written in an n-th share table among the first through N-th share tables indicate shares of an n-th object person, n representing an integer of at least 1 and no greater than N, the same draw ticket is allocated to n-th ticket fields included in the first through N-th share tables, and with respect to the draw ticket allocated to the n-th ticket fields, a share written in the n-th share table issued to the n-th object person differs from a share written in a k-th share table issued to a k-th object person, k representing an integer of at least 1 and no greater than N and differing from the integer represented by n.

11. The non-transitory computer-readable storage medium according to claim 10, wherein the first through N-th share tables each further include first through N-th share fields, in the writing in each of the first through N-th share tables, the shares of money for the cases where the money is given to the draw tickets allocated to the first through N-th ticket fields are written in the first through N-th share fields, respectively, the shares written in the first through N-th share fields included in the n-th share table indicate the shares of the n-th object person, and the share written in an n-th share field included in the n-th share table issued to the n-th object person differs from the share written in an n-th share field included in the k-th share table issued to the k-th object person.

12. The non-transitory computer-readable storage medium according to claim 11, by which writing into a member list is performed, the member list including first through N-th member list-use ticket fields, first through N-th member list-use share fields, and first through N-th member list-use object person fields, the share table issuance method further comprising:

writing in the first through N-th member list-use ticket fields, the symbol strings written in the first through N-th ticket fields, respectively, writing in an n-th member list-use share field, the share written in the n-th share field included in the n-th share table, and writing in the first through N-th member list-use object person fields, the information items for identifying the first through N-th object persons, respectively.

13. The non-transitory computer-readable storage medium according to claim 11, wherein in the writing in each of the first through N-th share tables, the shares are respectively written in n-th share fields included in the first through N-th share tables so that a sum of the shares is less than money possibly to be given to the draw ticket allocated to the n-th ticket fields.

14. The non-transitory computer-readable storage medium according to claim 11, wherein
the draw ticket allocated to the n-th ticket field included in the n-th share table is allocated to the n-th object person,
the share written in the n-th share field included in the n-th share table is a share of money for a case where the money is given to the draw ticket allocated to the n-th object person,
draw tickets allocated to ticket fields other than the n-th ticket field among the first through N-th ticket fields included in the n-th share table are allocated to object persons other than the n-th object person among the first through N-th object persons, and
shares written in share fields other than the n-th share field among the first through N-th share fields included in the n-th share table are shares of the n-th object person for the draw tickets allocated to the object persons other than the n-th object person among the first through N-th object persons.

15. The non-transitory computer-readable storage medium according to claim 11, the share table issuance method further comprising:
creating a share table form; and
copying, wherein
the share table form includes blank first through N-th ticket fields and blank first through N-th share fields,
in the allocating draw tickets different from one another, the draw tickets different from one another are allocated to the first through N-th ticket fields of the share table form, respectively,
in the writing in the first through N-th ticket fields, the symbol strings given to the draw tickets allocated to the first through N-th ticket fields of the share table form are written in the first through N-th ticket fields of the share table form, respectively,
in the copying, plural copies of the share table form with the symbol strings written in the first through N-th ticket fields are made to create first through N-th share tables including the blank first through N-th share fields, and
in the writing in each of the first through N-th share tables, the shares of money for cases where the money is given to the draw tickets allocated to the first through N-th ticket fields are written in the blank first through N-th share fields, respectively, in each of the first through N-th share tables including the blank first through N-th share fields.

16. The non-transitory computer-readable storage medium according to claim 10, the share table issuance method further comprising
reading the symbol strings by a symbol string reader, the symbol strings being printed on the draw tickets, wherein
in the writing in the first through N-th ticket fields, the symbol strings are acquired from the symbol string reader.

17. The non-transitory computer-readable storage medium according to claim 10, wherein
the symbol strings given to the draw tickets are each input to a terminal connected to a network, and
in the writing in the first through N-th ticket fields, each of the symbol strings is acquired from the terminal through the network.

18. The non-transitory computer-readable storage medium according to claim 10, wherein
the share tables each further include a coupon field, and
the share table issuance method further comprises writing a condition for use of a coupon in the coupon field.

* * * * *